US006975987B1

(12) United States Patent
Tenpaku et al.

(10) Patent No.: US 6,975,987 B1
(45) Date of Patent: Dec. 13, 2005

(54) DEVICE AND METHOD FOR SYNTHESIZING SPEECH

(75) Inventors: Seiichi Tenpaku, Minoh (JP); Toshio Hirai, Minoh (JP)

(73) Assignee: Arcadia, Inc., Osaka (JP)

( * ) Notice: Subject to any disclaimer, the term of this patent is extended or adjusted under 35 U.S.C. 154(b) by 771 days.

(21) Appl. No.: 09/678,544

(22) Filed: Oct. 4, 2000

(30) Foreign Application Priority Data

Oct. 6, 1999 (JP) ................................ 11/285125

(51) Int. Cl.[7] ......................... G01L 13/00; G01L 13/04
(52) U.S. Cl. ...................................... 704/258; 704/268
(58) Field of Search ............................... 704/205, 207, 704/258, 260, 265, 267, 268, 269

(56) References Cited

U.S. PATENT DOCUMENTS 4,468,804 A * 8/1984 Kates et al. ................ 704/265
4,586,191 A * 4/1986 Nishimura .................. 704/258
4,734,795 A * 3/1988 Fukami et al. ................. 360/8
5,086,475 A * 2/1992 Kutaragi et al. ............ 704/265
5,384,893 A * 1/1995 Hutchins .................... 704/267
5,479,564 A * 12/1995 Vogten et al. .............. 704/267
5,519,166 A * 5/1996 Furuhashi et al. ............ 84/603
5,671,330 A * 9/1997 Sakamoto et al. .......... 704/268
5,758,320 A * 5/1998 Asano ........................ 704/258
5,787,398 A * 7/1998 Lowry ........................ 704/268
5,832,437 A * 11/1998 Nishiguchi et al. ......... 704/268
5,864,812 A * 1/1999 Kamai et al. ............... 704/268
5,873,059 A * 2/1999 Iijima et al. ................ 704/207
5,884,253 A * 3/1999 Kleijn ........................ 704/223
5,905,972 A * 5/1999 Huang et al. ............... 704/268
6,101,470 A * 8/2000 Eide et al. .................. 704/260
6,253,182 B1 * 6/2001 Acero ........................ 704/268
6,421,636 B1 * 7/2002 Cooper et al. .............. 704/205
6,438,522 B1 * 8/2002 Minowa et al. ............. 704/258

FOREIGN PATENT DOCUMENTS

JP 10-078792 3/1998

OTHER PUBLICATIONS

English Language Abstract of JP-10-078792.
Copy of Japanese Office Action dated Feb. 21, 2005.

* cited by examiner

*Primary Examiner*—Martin Lerner
(74) *Attorney, Agent, or Firm*—Michael Bednarek; Pillsbury Winthrop Shaw Pittman LLP

(57) ABSTRACT

The present invention provides pitch conversion processing technology capable of minimizing the distortion of speech sound naturalness. A speech waveform in a pitch-unit is considered to be divided into two segments: 1) the segment of β, that starts from the minus peak, where the waveform depending on the shape of vocal tracts appears, and 2) the segment of γ where the waveform depending on the vocal tract shape is attenuating and converging on the next minus peak. In addition, α is the point where a minus peak appears along with the glottal closure. Based on characteristics of speech waveforms, the present invention processes waveform for converting pitch in the segment of γ just before the next minus peak, which is least affected by the minus peak associated with the glottal closure. As such, waveform processing can be performed by keeping the complete contour of waveform at around the peak, and thereby reducing the effects of pitch conversion.

12 Claims, 28 Drawing Sheets

PROGRAM FOR PITCH CONVERSION PROCESS

FIG.8

WORD DICTIONARY

| WORD | PART OF SPEECH | READING | ---- | SYLLABLE | ACCENT VALUE |
|---|---|---|---|---|---|
| 桜 | NOUN | s a k u r a | ---- | s a | 1 |
| | | | | k u | 5 |
| | | | | r a | 0 |
| さく | VERB | s a k u | ---- | s a | 5 |
| | | | | k u | 0 |
| ⋮ | ⋮ | ⋮ | | ⋮ | ⋮ |
| が | POST POSITIONAL PARTICAL OF JAPANESE | g a | ---- | g a | 2 |
| ⋮ | ⋮ | ⋮ | | ⋮ | ⋮ |

FIG.9

DICTIONARY OF SYLLABLE DURATION

| SYLLABLE | DURATION [ms] |
|---|---|
| a | 110 |
| i | 114 |
| u | 90 |
| ⋮ | ⋮ |
| ko | 188 |
| ⋮ | ⋮ |

FIG.10

| SYLLABLE | CHAIN OF SYLLABLE SEQUENCE | [ms] TIME | [ms] SYLLABLE DURATION | ACCENT VALUE |
|---|---|---|---|---|
| ko | koN | 0 | 188 | 0 |
| N | NnI | 188 | 92 | 5 |
| nI | nIch | 280 | 212 | 5 |
| chI | chIw | 492 | 178 | 0 |
| wa | wa | 670 | 166 | 7 |

FIG.12

DICTIONARY OF VOICED / UNVOICED SOUNDS FOR CONSONANTS / VOWELS

| PHONEME | INDEX |
|---|---|
| a | V |
| i | V |
| ⋮ | ⋮ |
| k | CU |
| ⋮ | ⋮ |
| b | CV |
| ⋮ | ⋮ |

FIG.13
DICTIONARY OF SOUND SOURCE AMPLITUDE
| SYLLABLE | SOUND SOURCE AMPLITUDE |
|---|---|
| a | 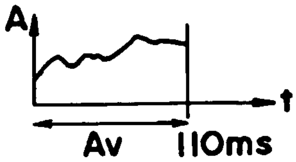 |
| ⋮ | ⋮ |
| ko | 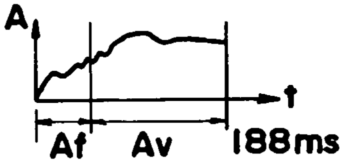 |
| ⋮ | ⋮ |
Av : VOICED SOUND SOURCE AMPLITUDE
Af : UNVOICED SOUND SOURCE AMPLITUDE FIG.14
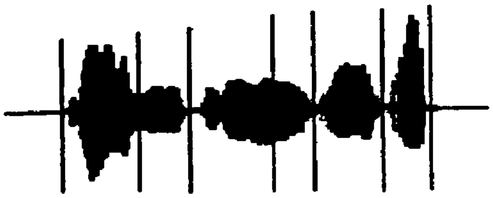
CONTOUR OF SOUND SOURCE AMPLITUDE OF / ko /
CONTOUR OF FUNDAMENTAL FREQUENCY OF / ko /
DURATION OF / ko / 123ms
PITCH MARK 0、15、30、…
ZERO CROSSING MARK 12、27、42、…

FIG.17

| SYLLABLE WEIGHT | TYPE OF SYLLABLE WEIGHT | SYLLABLE STRUCTURE | EXAMPLE |
|---|---|---|---|
| 1 | LIGHT SYLLABLE | (C) (y) V | ka, sa, ta, na, ha, ma, ya, ra,...<br>a, i, u, e, o, ....<br>che, pya,.... |
| 2 | HEAVY SYLLABLE | (C) (y) V R<br>(C) (y) V J<br>(C) (y) V N<br>(C) (y) V Q | to: , ya:, kyu:, pyu:,...<br>kai, nou, ai, ui, pyua,...<br>kaN, aN, myaN, chaN,...<br>chuQ, ryaQ, jaQ, hyaQ,... |
| 3 OR MORE | SUPER HEAVY SYLLABLE | (C) (y) V R N<br>(C) (y) V R Q<br>(C) (y) V J N<br>(C) (y) V J Q<br>(C) (y) V N Q<br>AND THE LIKE | che:N, ju:N, a:N, ...<br>u:Q, che:Q,...<br>saiN, pauN, auN, chaiN,...<br>kaiQ, daiQ, kyaiQ, uiQ,...<br>doNQ, uNQ, chaNQ,... |

C : CONSONANT (EXCLUDING Q, Y AND N)
y : SEMI VOWEL
V : VOWEL (EXCLUDING R AND J)
R : LONG VOWEL
J : THE SECOND ELEMENT OF DIPHTHONG
Q : GEMINATED SOUND (JAPANESE SOKUON)
N : SYLLABIC NASAL
(X) : SYLLABLE WEIGHT IS INDEPENDENT OF X

DEVICE AND METHOD FOR SYNTHESIZING SPEECH

CROSS REFERENCE TO RELATED APPLICATIONS

All the content disclosed in Japanese Patent Application No. H11-285125 (filed on Oct. 6, 1999), including specification, claims, drawings and abstract and summary is incorporated herein by reference in its entirety.

BACKGROUND OF THE INVENTION

1. Field of the Invention

This invention relates to speech processing like speech synthesis and, more particularly, to pitch conversion process.

2. Description of the Related Art

Concatenative Synthesis is a known speech synthesis. In this method, speech sound is synthesized by means of concatenating the prepared sound waveforms. However, there is a problem that natural sounding speech can not be obtained simply from the concatenation of the prepared waveforms because of the incapability of intonation control.

In order to solve this problem, PSOLA (Pitch Synchronous Overlap Add) method has been suggested. In this method, speech sound with the different pitch length can be obtained by filtering two pitch-unit speech waveforms through a Hanning window and making them slightly overlapped each other. (E. Moulines et. al, "Pitch-Synchronous waveform processing techniques for text-to-speech synthesis using diphones" Speech Communication, 1990.9).

Referring to FIG. 22 and FIG. 23, the PSOLA method is described as follows. FIG. 22 shows a part of speech waveform. The waveform is repeated almost periodically. This one repeating unit is a pitch. Pitch of the sound varies depending on this pitch length.

In the PSOLA method, at first, a waveform is clipped out with its peak point of M as a center using a Hanning window as shown in FIG. 23. Next, the clipped waveforms are overlapped until their pitch lengths agree with the target pitch length. The width of the Hanning window for filtering is set in such a way that the clipped waveforms will be overlapped by one half. Thus, pitch can be converted to minimize the generation of undesirable frequency components. Therefore, if pitch is converted by modifying fundamental frequency using the PSOLA method, the intonation can be controlled.

However, the PSOLA method still has following problems.

Firstly, as shown in FIG. 24 to FIG. 27, unnatural reduction of amplitude might happen in the segment where waveforms are overlapping. FIG. 24 shows an original waveform (indicated with a damped sine wave for easy understanding). FIG. 25 shows the waveform filtered through the left side components of a Hanning window. FIG. 26 shows the waveform filtered through the right side components of a Hanning window. FIG. 27 shows a composite waveform. As indicated in FIG. 27, the unnatural reduction in amplitude appears in the middle part of a pitch. This amplitude reduction causes a distortion of microstructure of speech waveform represented by formant.

Secondly, another problem is that echoes are produced with the contiguous pitch peaks as shown in FIG. 28. This is indicated in H. Kawai, et. al. "A study of a text-to-speech system based on waveform splicing," Tech. Rep. of the Institute of Electronics, Information and Communication Engineers, SP93–9, pp. 49–54, Japan (1993,5) (in Japanese, the abstract in English). In this literature, the writer proposes the use of a trapezoidal window. However, using the mentioned trapezoidal window might still produce undesirable frequency components during the process of overlapping that make the synthesized sound unnatural.

As shown in FIG. 1, a speech waveform in a pitch-unit is considered to be divided into two segments: 1) the segment of $\beta$, that starts from the minus peak at which the waveform depending on the shape of vocal tracts appears and 2) the segment of $\gamma$ at where the waveform, depending on the vocal tract shape, is attenuating and converging on the next minus peak. In addition, a in FIG. 1 is the point at which a minus peak appears along with the glottal closure. In the described PSOLA method, the center of the Hanning window is set at around the peak of M during a pitch with the goal of maintaining the contour of waveform around the peak of M. However, putting too much emphasis on the maintenance of the waveform contour around the peak brought about the above-described problems.

SUMMARY OF THE INVENTION

It is an object of the present invention to provide a pitch conversion process technology capable of solving the problems described above and of minimizing the distortion of the naturalness of speech sound.

In order to achieve this object, the present invention processes waveform by converting pitch in the segment of $\gamma$ just before the next minus peak, which is least affected by the minus peak associated with the glottal closure, on the basis of the described characteristics of speech waveforms. As such, waveform processing can be performed by keeping the complete contour of waveform at around the peak and thereby reducing the effects of pitch conversion.

Moreover, according to the present invention, the sampled speech waveforms to find out which part of pitch is consistent. FIG. 2 shows several pitch-unit waveforms of /a/. It is apparent that waveforms are similar until 2.5 ms. From that point, they stay at around zero value, and, from a certain point, they simply decline and converge on the minus peak value. Therefore, it is clear that the pitch difference of each waveform in actual utterances is dependent upon the difference in duration of a zero value segment or the difference of the start point of a simple declining segment. Consequently, it has been found out that an optimal pitch conversion can be performed by processing the segment of $\gamma$ and, particularly, the zero value area.

In accordance with characteristics of the present invention, there is provided a speech synthesis device comprising:

speech database storing means for storing sample waveform data in a speech unit and a speech database created by associating the sample sound waveform data with their corresponding phonetic information;

speech waveform composing means for dividing phonetic information into speech units upon receiving the phonetic information of speech sound to be synthesized, for obtaining sample speech waveform data corresponding to the each phonetic information in a speech unit from the speech database, and for generating speech waveform data to be composed by means of concatenating the sample speech waveform data in speech units; and analog converting means for converting the speech waveform data received from the speech waveform composing means into analog signals;

wherein the speech waveform composing means comprises pitch converting means for converting pitch by means of processing a segment of a waveform in which the waveform is converging on a minus peak during a periodical unit of speech waveform data.

Also, in accordance with characteristics of the present invention, there is provided a computer-readable storing medium storing a program for executing pitch conversion using a computer, the program comprising the step of:

processing a segment of a waveform in which the waveform is converging on a minus peak during a periodical unit of speech waveform data, upon receiving the speech waveform data requiring pitch conversion.

Further, in accordance with characteristics of the present invention, there is provided a speech synthesis device comprising:

speech database storing means for storing a speech database having several sample speech waveform data with various pitch lengths for each speech unit and phonetic information associated with these sample waveform data;

speech waveform composing means for dividing phonetic information into speech units upon receiving phonetic information of speech sound to be synthesized, for obtaining a desirable sample speech waveform data from among the sample speech waveform data corresponding to the divided phonetic information in a speech unit in the speech database, and for generating speech waveform data to be composed by means of concatenating the obtained sample speech waveform data in speech units; and analog converting means for converting the speech waveform data received from the speech waveform composing means into analog signal;

wherein the speech database is constructed of several sample speech waveform data with various pitch lengths prepared by modifying a contour of a waveform in a segment in which the waveform is converging on the minus peak during a periodical unit of speech waveform data.

In accordance with characteristics of the present invention, there is provided a computer-readable storing medium storing a program for executing speech synthesis by means of a computer using a speech database, the program comprising the steps of:

receiving phonetic information of speech sound to be synthesized and dividing the phonetic information into speech units;

obtaining a desirable sample speech waveform data from among sample speech waveform data corresponding to the divided phonetic information in a speech unit in the speech database; and generating speech waveform data to be composed by means of concatenating the obtained sample speech waveform data in speech units;

wherein the speech database is constructed of several sample speech waveform data with various pitch lengths prepared by modifying a contour of a waveform in a segment in which the waveform is converging on a minus peak during a periodical unit of speech waveform data.

Also, in accordance with characteristics of the present invention, there is provided a computer-readable storing medium for storing several sample speech waveform data with various pitch lengths for each speech unit, wherein these several sample speech waveform data are prepared by modifying a contour of a waveform in a segment in which the waveform is converging on a minus peak during a periodical unit of speech waveform data.

Further, in accordance with characteristics of the present invention, there is provided a computer-readable storing medium for storing a speech database, the storing medium comprising:

a sample waveform data storing area storing sample waveform data of human speech utterances in a speech unit;

a phonetic information storing area storing phonetic information associated with the sample waveform data in the speech unit; and an indicating information storing area that stores information to provide a last zero crossing point before a minus peak in the sample waveform data.

In accordance with characteristics of the present invention, there is provided a method of pitch conversion for speech waveform, the method comprising the step of:

performing pitch conversion by processing waveform in a segment in which the waveform is converging on a minus peak during a periodical unit of speech waveforms.

Also, in accordance with characteristics of the present invention, there is provided a speech processing device for processing speech waveform in accordance with entered commands, wherein at least any one of amplitude, fundamental frequency or duration of speech is modified using corresponding icons or switches of the up arrow, the down arrow, the right arrow or the left arrow.

Further, in accordance with characteristics of the present invention, there is provided a computer-readable storing medium storing a program for implementing a speech processing device for processing speech waveform in accordance with entered commands, the program comprising the step of:

modifying at least any one of amplitude, fundamental frequency or duration of speech with using corresponding icons or switches of the up arrow, the down arrow, the right arrow or the left arrow using a computer.

Also, in accordance with characteristics of the present invention, there is provided a speech processing device for processing speech waveform in accordance with entered commands, wherein the up arrow at least to raise fundamental frequency and the down arrow at least to lower fundamental frequency are assigned.

Further, in accordance with characteristics of the present invention, there is provided a computer-readable storing medium storing a program for implementing a speech processing device for processing speech waveform in accordance with entered commands, the program comprising the step of:

assigning the up arrow at least to raise fundamental frequency and the down arrow at least to lower fundamental frequency using a computer.

In this invention, the term "speech unit" refers to a unit in which speech waveforms are handled, in speech synthesis or speech analysis.

The term "speech database" refers to a database in which at least speech waveforms and corresponding phonetic information are stored.

The term "speech waveform composing means" refers to means for generating a speech waveform associated with a given phonetic information according to rules or sample waveforms. In an embodiment of the present invention, steps S4 to S12 in FIG. 5 and FIG. 6 are corresponding to this speech waveform composing means.

The term “periodical unit” refers to a unit of speech waveform that repeats periodically. In an embodiment of the present invention, pitch is corresponding to a periodical unit.

The term “arrow” refers to a sign indicating or suggesting a direction including, for example, a triangle as a direction indicator.

The term “storing medium on which programs or data are stored” refers to a storing medium including, for example, a ROM, a RAM, a flexible disk, a CD-ROM, a memory card or a hard disk on which programs or data are stored. It also includes a communication medium like a telephone line and other communication networks. In other words, this term includes not only the storing medium, like a hard disk which stores programs executable directly upon connection with CPU, but also the storing medium like a CD-ROM etc., which stores programs executable after being installed in a hard disk.

Further, the term “programs (or data)” here, includes not only directly executable programs, but also source programs, compressed programs (or data), and encrypted programs (or data).

Other objects and features of the present invention will be more apparent to those skilled in the art on consideration of the accompanying drawings and following specification, in which are disclosed several exemplary embodiments of the present invention. It should be understood that variations, modifications and elimination of parts may be made therein as fall within the scope of the appended claims without departing from the spirit of the invention.

BRIEF DESCRITION OF THE DRAWINGS

FIG. 8 is a table illustrating the contents of a word dictionary;

FIG. 9 is a table illustrating the contents of a dictionary of syllable duration;

FIG. 10 is a view showing a part of the analysis table;

FIG. 12 is a table illustrating the contents of a dictionary of voiced/unvoiced sounds of consonants/vowels;

FIG. 13 is a table illustrating the contents of a dictionary of sound source amplitude;

FIG. 14 is a view showing the contents of a speech database;

FIG. 17 is a table illustrating the definitions of Extended CV;

DETAILED DESCRIPTION OF REPRESENTATIVE EMBODIMENTS

1. The First Embodiment (1) Overall Structure

Figure 3:
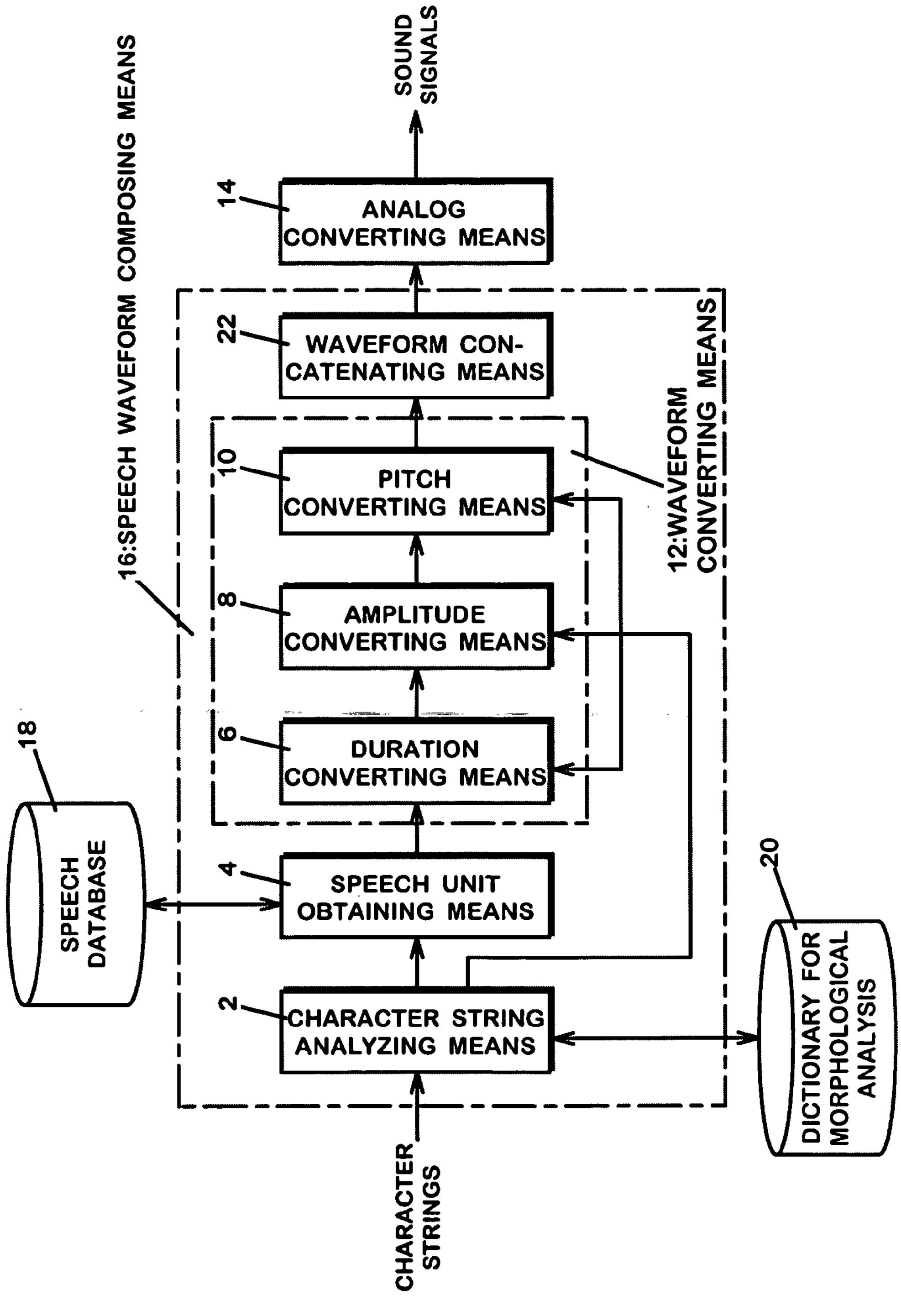
FIG. 3 is a diagram illustrating an overall configuration of the speech synthesis device according to a representative embodiment of the present invention.

FIG. 3 shows an overall structure of the speech synthesis device according to the first representative embodiment of the present invention. In this embodiment, speech waveform composing means 16 comprises character string analyzing means 2, speech unit obtaining means 4, waveform converting means 12, and waveform concatenating means 22. Moreover, the waveform converting means 12 comprises duration converting means 6, amplitude converting means 8 and pitch converting means 10.

A provided character string is morphologically analyzed with the character string analyzing means 2, referring to a dictionary for morphological analysis 20. The character string is divided into speech units. Further, character string analyzing means 2, by referring to the environment of the preceding and succeeding sequences of sounds, determines the voiced and unvoiced sounds classification, duration, the contour of amplitude, and the contour of fundamental frequency for each speech unit by referring to the dictionary for morphological analysis 20.

Upon receiving the result of morphological analysis from character string analyzing means 2, speech unit obtaining means 4 obtains sample speech waveforms in each speech unit from a speech database 18. The duration converting means 6 converts the duration of the obtained sample speech waveforms in accordance with the duration provided by the character string analyzing means 2. And amplitude converting means 8 converts the amplitude of the obtained sample speech waveforms in accordance with the amplitude provided by the character string analyzing means 2. The pitch converting means 10, in accordance with the contour of fundamental frequency provided by the character string analyzing means 2, converts the pitch of the obtained sample speech waveforms. The sample speech waveforms in each speech unit, as desirably processed as described above, are concatenated by means of the waveform concatenating means 22. Thus, a speech waveform data is produced.

Analog converting means 14 converts this speech waveform data into analog sound signals and produces output.

(2) Hardware Configuration

Figure 4:
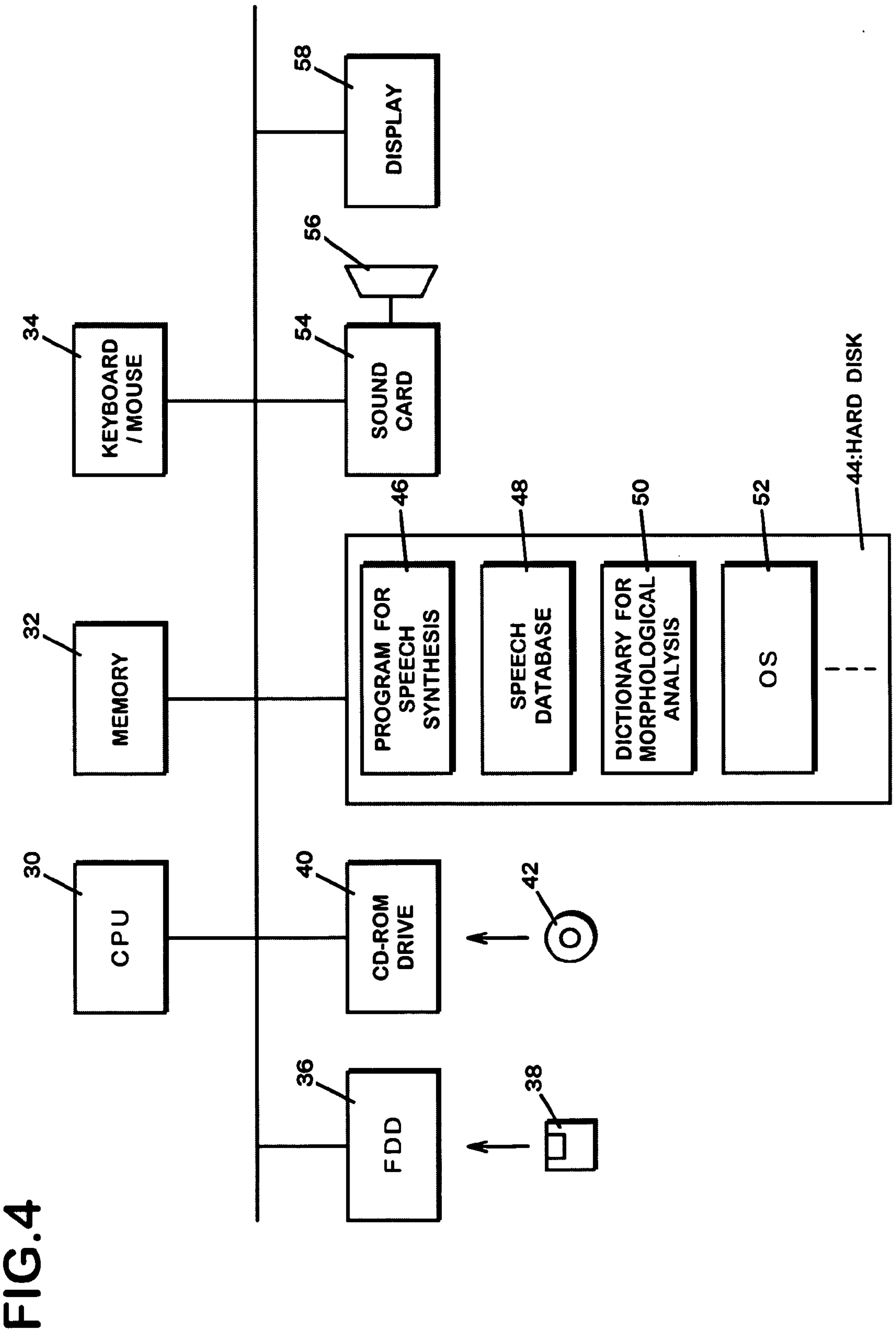
FIG. 4 is a block diagram illustrating a hardware configuration of the device shown in FIG. 3.

FIG. 4 shows an embodiment of a hardware configuration using a CPU for the speech synthesis device of FIG. 3. Connected to a CPU 30 are a memory 32, a keyboard/mouse 34, a floppy disk drive (FDD) 36, a CD-ROM drive 40, a hard disk 44, a sound card 54 forming the analog converting means, and a display 58. Stored in the hard disk 44 are an operating system (OS) 52 such as WINDOWS 98™ by Microsoft™, a speech synthesis program 46, a speech database 48 and a dictionary for morphological analysis 50. These programs are installed from the CD-ROM 42 using the CD-ROM drive 40.

In this embodiment, the speech synthesis program 46 performs its functions in combination with the operating system (OS) 52. However, the speech synthesis program 46 may perform a part of or all of its functions by itself.

(3) Speech Synthesis Processing

Figure 5:
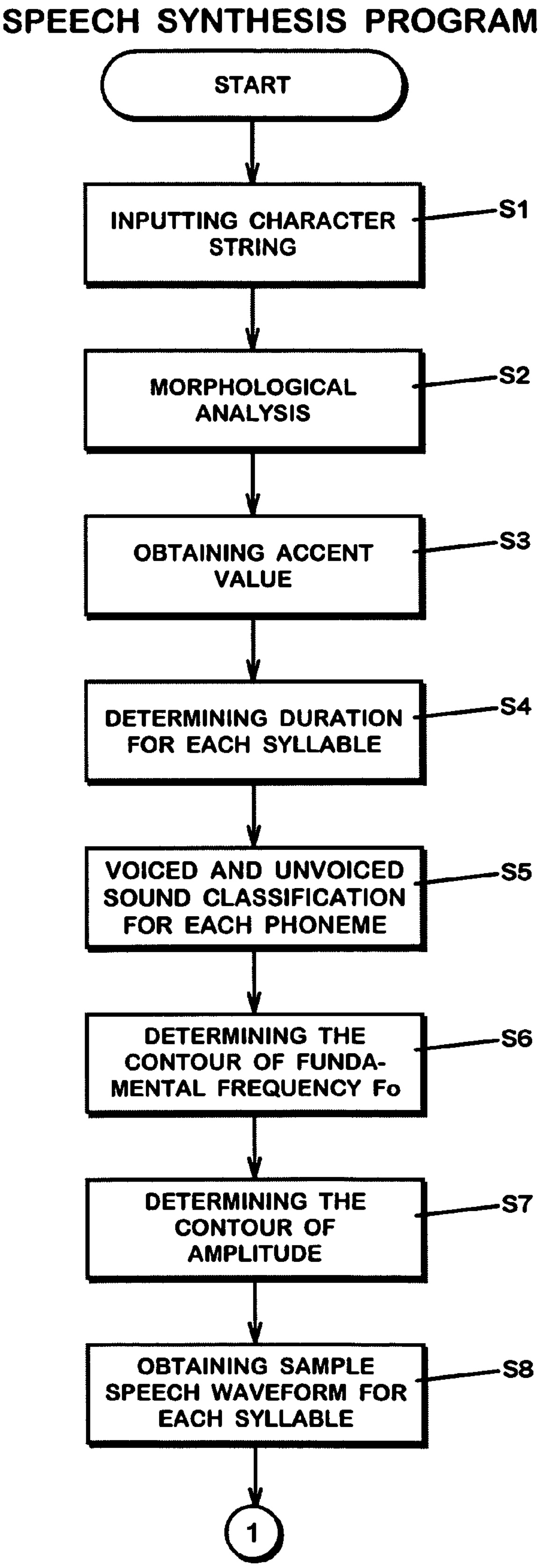
FIG. 5 is a flow chart showing the speech synthesis processing program.

FIG. 5 is a flow chart showing the speech synthesis program stored in the hard disk 44. First, an operator inputs a character string corresponding to the speech sound to be synthesized, using the keyboard 34 (step S1). Alternatively, a character string stored on the floppy disk 38 or transferred from other computers through networks may be used.

Next, the CPU 30 performs morphological analysis of the character string using reference to the word dictionary in the dictionary for morphological analysis 50 (step 2). The contents of this word dictionary are shown in FIG. 8. Then, the CPU 30, using reference to the word dictionary, breaks up the character string into words and obtains the pronunciation of each word. For example, when the character string of "ko n ni chi wa" is provided, a pronunciation as "/koNnichiwa/" is obtained.

Furthermore, accent value of syllables constituting a word is obtained for each word (step S3). Consequently, syllables of "ko" "N" "ni" "chi" "wa" together with their accent value as shown in FIG. 8 are obtained. Accent value depends upon the environment of the preceding and succeeding sequences of sounds. Therefore, the CPU 30 modifies the accent value using rules based on the relationships with the preceding and succeeding sequence of phonemes or syllables.

All syllables and their duration shown in FIG. 9, are stored in a dictionary of syllable duration in the dictionary for morphological analysis 50 on the hard disk 44. The CPU 30 obtains the syllable duration for each syllable by referring to the dictionary of syllable duration. Further, the CPU 30 modifies the duration based on the relationships with the preceding and succeeding sequence of phonemes or syllables (step S4 of FIG. 5)). Thus, a table for each syllable is prepared, as shown in FIG. 10.

As shown in FIG. 12, all phonemes and their classification of voiced/unvoiced sound are stored in a dictionary of voiced/unvoiced sounds of consonants/vowels in the dictionary for morphological analysis 50. In the index column in FIG. 12, "V" denotes vowels (voiced sound), "CU" denotes unvoiced sound of consonants and "CV" denotes voiced sound of consonants. The CPU 30 makes a voiced/unvoiced classification for each phoneme of "k" "o" "N" "n" "i" "ch" "i" "w" "a" by referencing to this dictionary. Furthermore, the CPU 30 determines voiced sounds that are uttered unvoiced by reference to a devoicing rule. Thus, each phoneme is classified into voiced or unvoiced sound (step S5 of FIG. 5).

Figure 11:
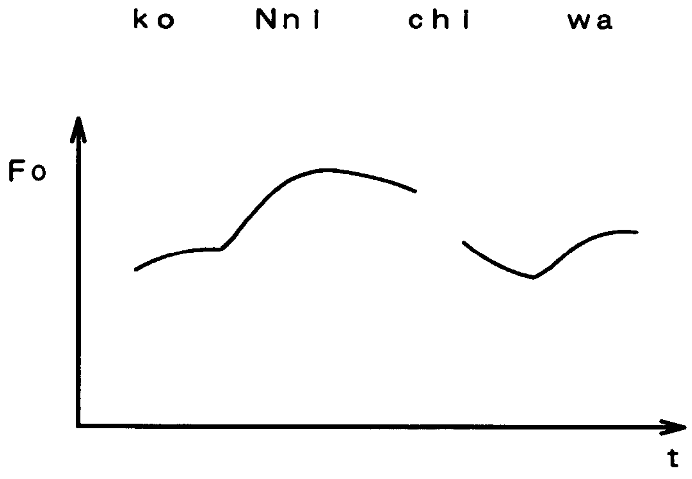
FIG. 11 is a graph showing the determined contour of fundamental frequency.

Next, the CPU 30 generates the contour of fundamental frequency Fo as shown in FIG. 11, according to the table in FIG. 10 (particularly to the accent value) (step S6 of FIG. 5). In the unvoiced segments, the fundamental frequency is not appearing.

Next, the contours of voiced sound source amplitude Av and unvoiced sound source amplitude Af are determined (step S7 of FIG. 5). In a dictionary of sound source amplitude in the dictionary for morphological analysis 50, the contours of sound source amplitude corresponding to each syllable are stored as shown in FIG. 13. The CPU 30, referring to this dictionary, determines voiced sound source amplitude Av and unvoiced sound source amplitude Af for each syllable of "ko" "N" "ni" "chi" "wa". In addition, the CPU 30 modifies the obtained sound source amplitude according to the accent value and the environment of the preceding and succeeding sequences of sounds. Moreover, the CPU 30 modifies the contour of sound source amplitude to conform to the determined syllable duration in step S4 in FIG. 5.

Figure 1:
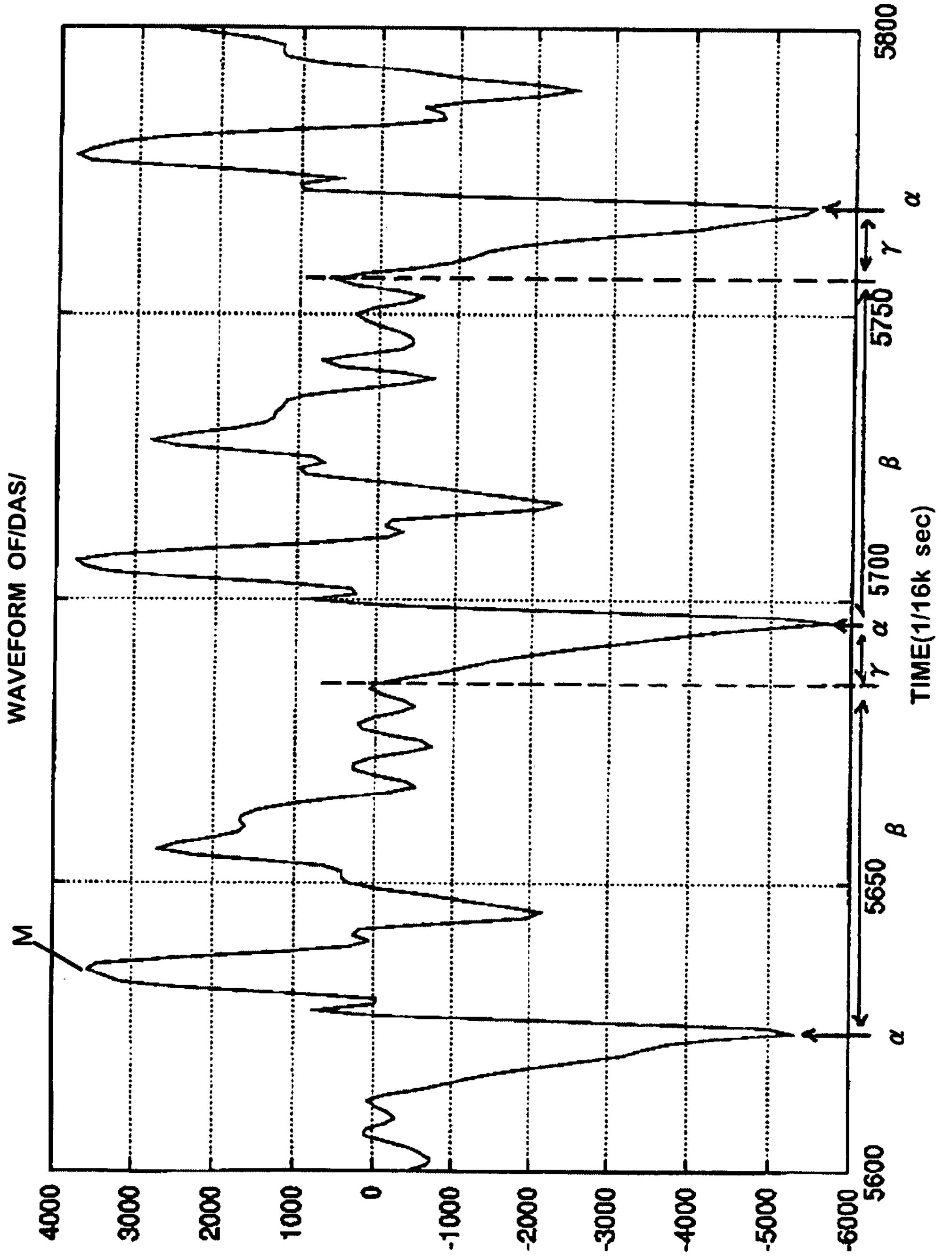
FIG. 1 is a graph showing a part of the speech waveform of /a/.
Figure 2:
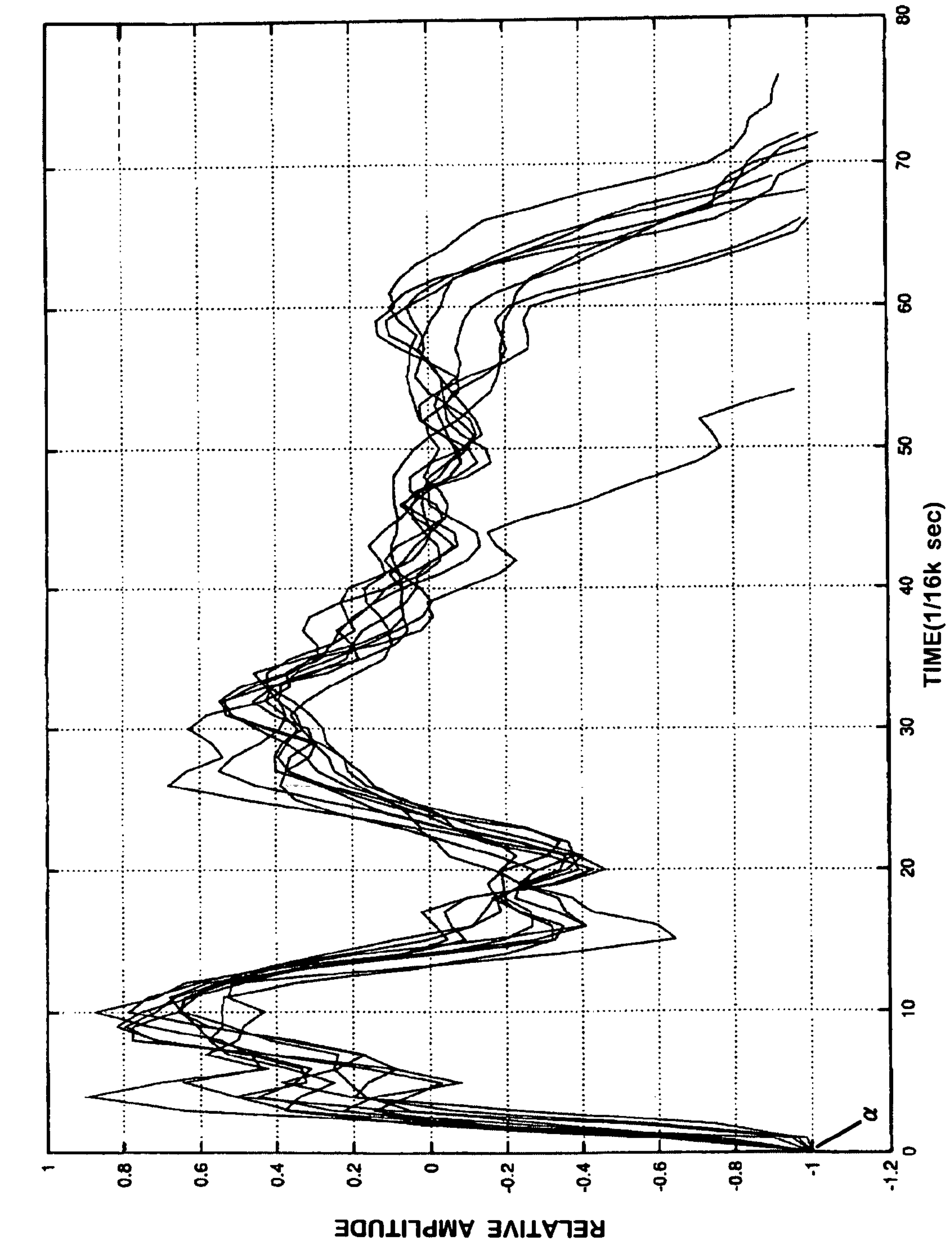
FIG. 2 is a graph showing many waveforms of /a/ overlapping one another.

Then, the CPU 30 obtains the sample speech waveforms for each syllable from the speech database 48. As shown in FIG. 14, the speech database 48 stores sample speech waveforms of real speech utterance that are divided into syllables and accompanied by phonetic information. Moreover, the contour of sound source amplitude, the contour of fundamental frequency, duration, a pitch mark and a zero crossing mark for each syllable are also stored in the speech database 48. The pitch mark here refers to a mark assigned to the location of the peak value at each pitch unit (see M in FIG. 1). The zero crossing mark refers to a mark assigned to the last zero crossing point before the minus peak for each pitch unit (see a in FIG. 1). In this embodiment, the pitch marks and the zero crossing marks are given with a time.

Because a massive number of sample waveforms are stored in the speech database, there is more than one sample waveform corresponding to one syllable, for example "ko". Therefore, the CPU 30 searches and obtains the optimal sample waveform for each syllable with reference to the relation with the preceding and succeeding syllable sequences (step S8 in FIG. 5).

Figure 6:
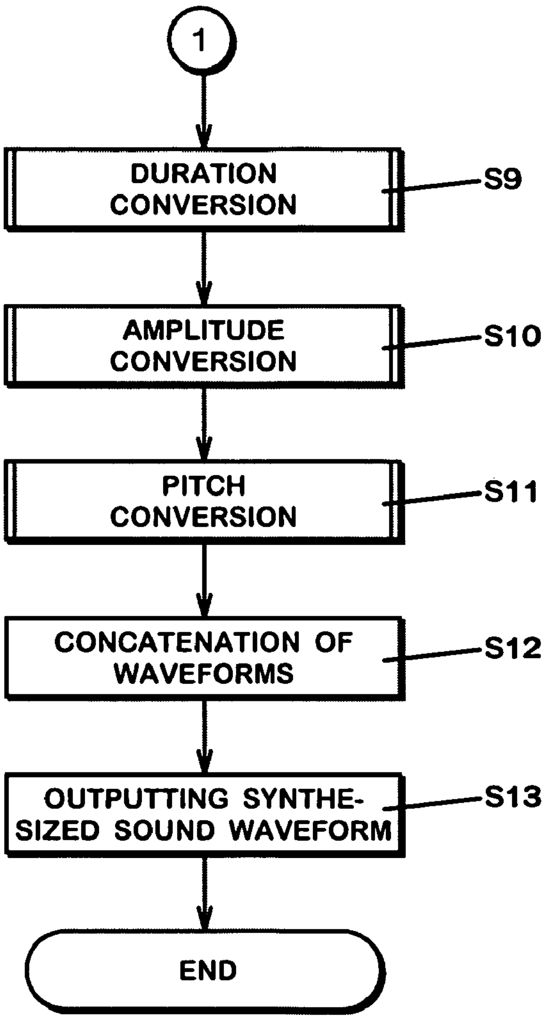
FIG. 6 is a flow chart showing the speech synthesis processing program.

Next, the CPU 30 modifies the sample speech waveform for each syllable so that the duration of the sample speech waveform obtained from the speech database 48 may conform to the duration determined in step S4 of FIG. 5 (step S9 in FIG. 6). This modification is made by duplicating (inserting the same waveforms) or deleting a few pitch-unit waveforms.

Then, the CPU 30 modifies the sample speech waveform obtained from the speech database 48 for each syllable so that its contour of amplitude may conform to the contour of amplitude determined in steps S7 of FIG. 5 (step S10 in FIG. 6).

Furthermore, the CPU 30 modifies the sample speech waveform obtained from the speech database 48 for each syllable so that its contour of fundamental frequency may conform to the contour of fundamental frequency determined in step S6 of FIG. 5 (step S11 in FIG. 6).

Figure 7:
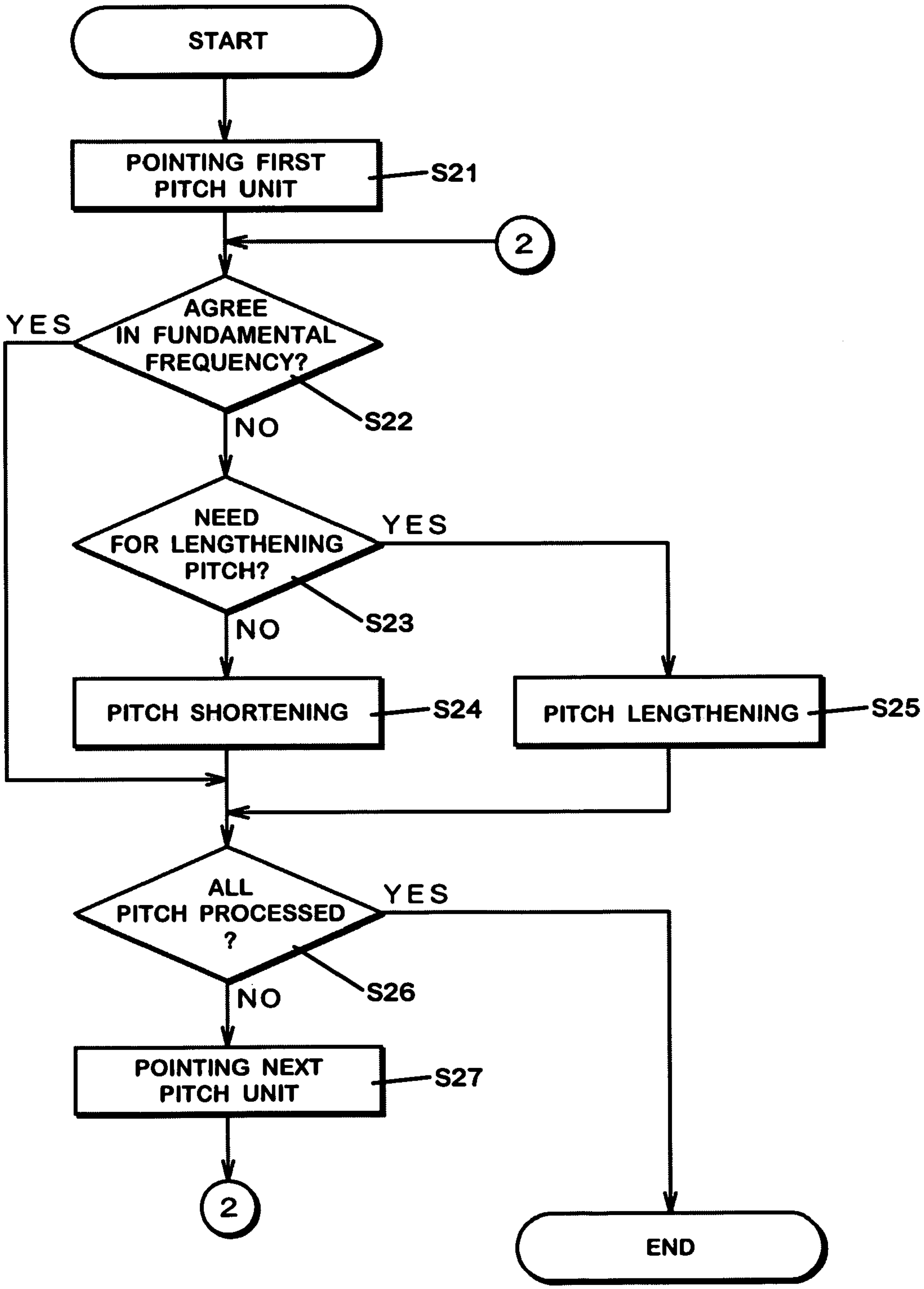
FIG. 7 is a flow chart showing the program for pitch conversion processing.

FIG. 7 is a flow chart showing the program for pitch conversion processing. Pitch conversion processing is performed only for the waveform of voiced sounds, because the waveform of unvoiced sounds does not contain the regular periodical repeats.

First, the CPU 30 obtains the fundamental frequency of the first pitch-unit of the sample speech waveform for the target syllable, from the contour of fundamental frequency data in the speech database 48. Next, the CPU 30 obtains the corresponding fundamental frequency using reference to the contour of fundamental frequency determined in step S6 of FIG. 5. Then the CPU 30 determines whether or not both fundamental frequencies are matching in step S22. If they are matching, the process goes to the next step S26(FIG. 7) since no pitch conversion is required.

If, in step S22, the CPU 30 determines that the fundamental frequencies do not much, then in step S23 of FIG. 7., the CPU 30 determined whether the pitch of sample sound waveform shall be lengthened (lowering fundamental frequency) or shall be shortened (raising fundamental frequency). Resulting from this judgement, pitch is lengthened (step S25) or shortened (step S24).

The CPU 30 finds out the last zero crossing point right before the minus peak in the objective pitch. The zero crossing point is easily determined because it is stored on the speech database as shown in FIG. 14.

Figure 15:
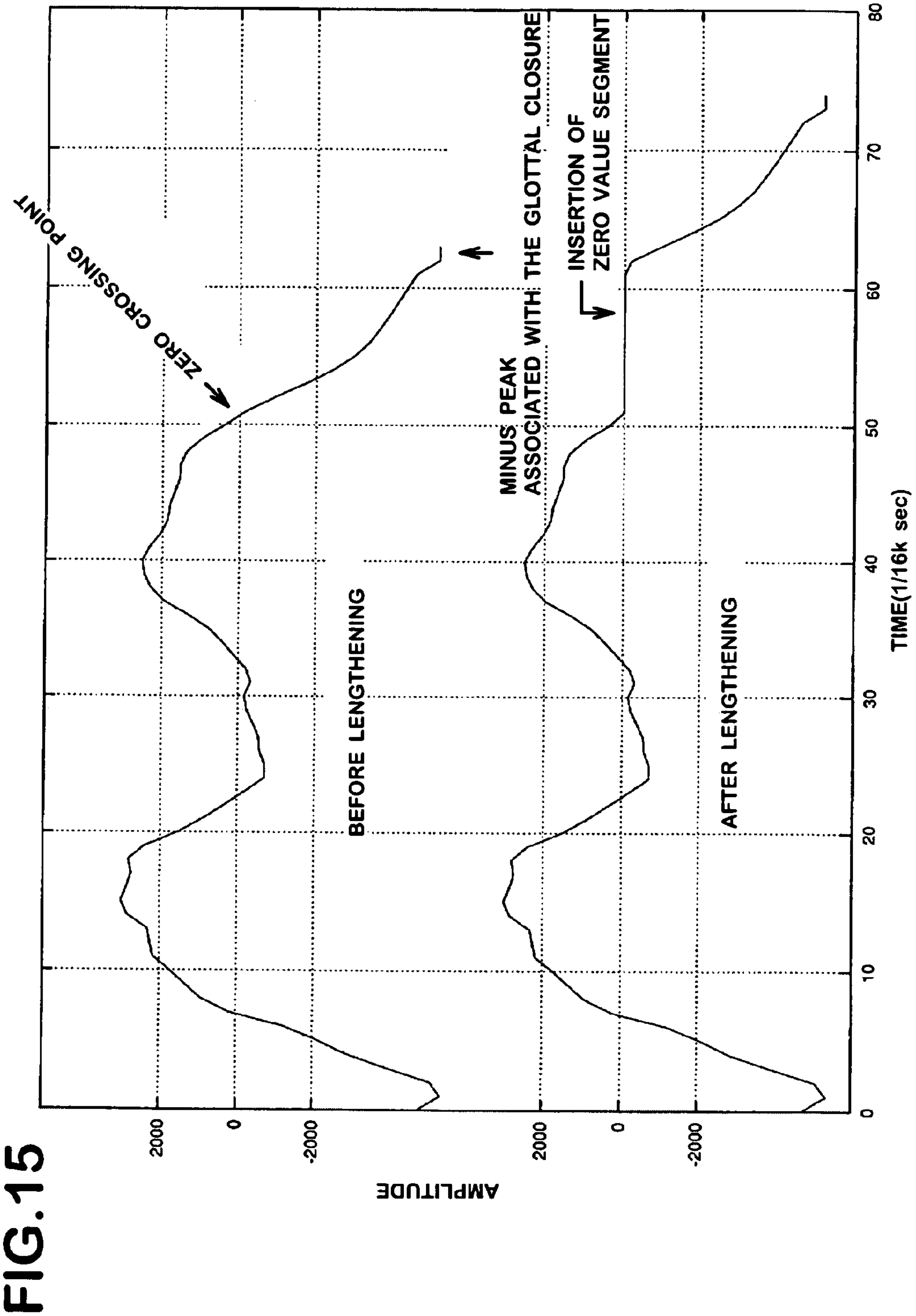
FIG. 15 is a graph showing pitch modification with zero value insertion.

To lengthen pitch, a zero value segment is inserted at this zero crossing point as shown in FIG. 15.

Figure 16:
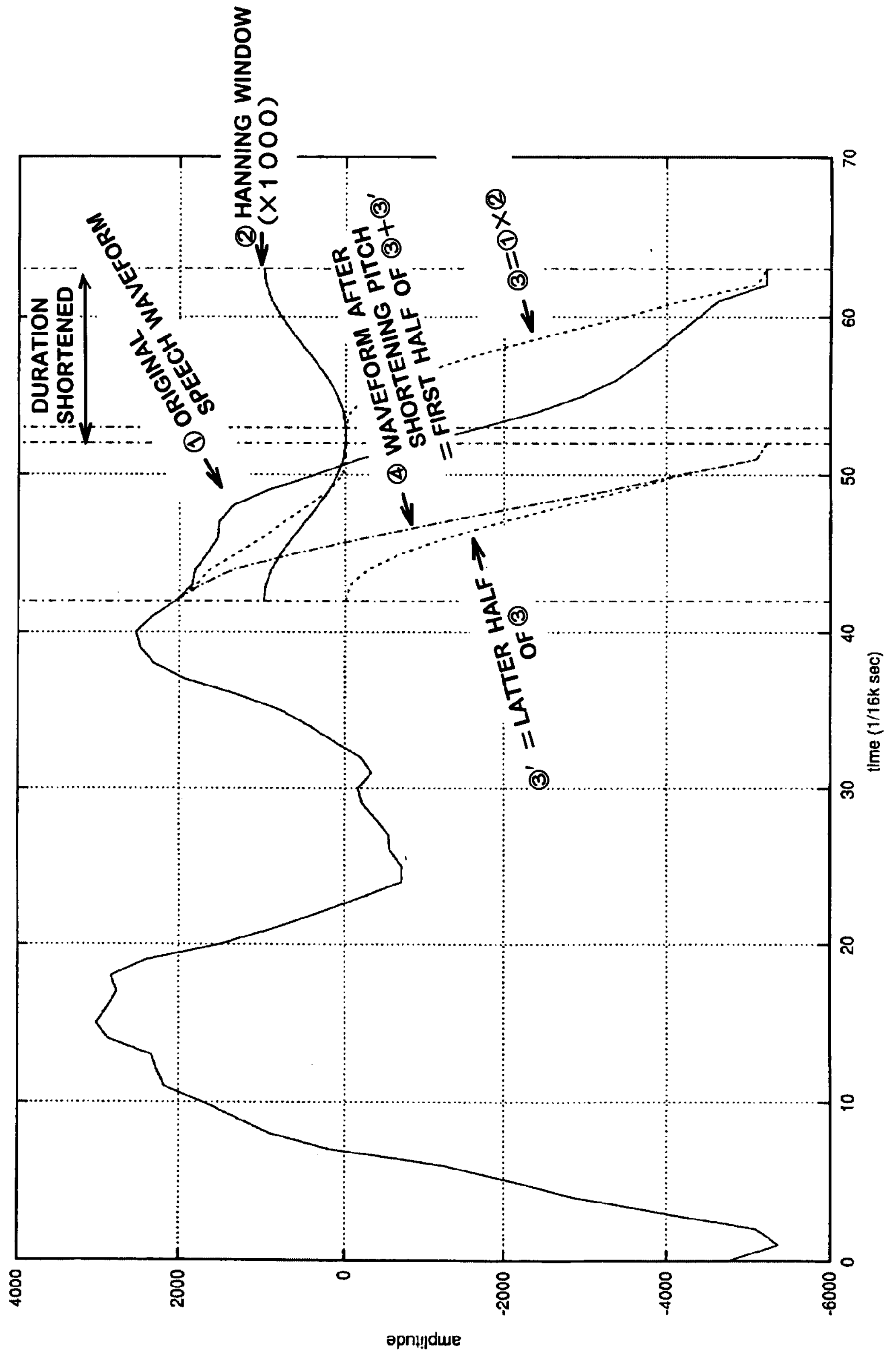
FIG. 16 is a graph showing pitch shortening with other than zero value deletion.

On the contrary, to shorten pitch, in case that there is an almost zero value segment around the zero crossing point, the segment is to be deleted as needed. In case that there is not a zero value segment at around the zero crossing point, the following operation as shown in FIG. 16 is performed to shorten pitch (shortened duration is N). Firstly, the frame between 2N−1 and N before the minus peak is filtered through the Hanning window with window magnitude of 1 at 2N−1 and 0 at N. Likewise, the frame before the minus peak between N−1 and the minus peak is filtered through the Hanning window with window magnitude of 1 at the minus peak and 0 at N−1 before the minus peak. The merger of waveform elements derived from the two window filtering is adopted as a modified waveform. Thus, a 2N frame is shortened to an N frame.

Alternatively, the above window processing may be performed by setting the window magnitude of 0 at around the location of zero crossing. The farther processing point is from zero crossing, the larger magnitude up to 1 is applied. Thus, at the point far from zero crossing point, the window magnitude of 1 is applied so that the waveform may be kept as it is, and the window magnitude of 0 is applied at the zero crossing so that the waveform may be substantially deleted. Accordingly, pitch can be shortened to minimize the distortion of naturalness by means of applying a bigger processing value to the segment around zero crossing, which is considered to be less influenced due to smaller amplitude.

After processing the pitch, the CPU 30 determines whether all pitch-unit waveforms have been likewise processed (step S26 of FIG. 7). If not all pitch-unit waveforms have been processed, then the steps from S22 (FIG. 7) forward are repeated for the non-processed pitch in the next step (S27 of FIG. 7. After processing all pitch-unit waveforms, the pitch conversion processing for the objective syllable is completed. A fine adjustment in duration is made when it is required after pitch conversion. The pitch conversion processing is carried out for all syllables in the selected sample waveform.

After completing the pitch conversion processing as described above, the process goes to the step S12 in FIG. 6. In the step of S12, the composed speech waveform is obtained by way of concatenating the sample waveform modified for each syllable. Finally, the CPU 30 provides this composed speech waveform to the sound card 54. The sound card 54 converts this waveform into analog signals and produces output through the speaker 56.

(4) Other Embodiment of Speech Database

In the embodiment described above, the speech database (speech corpus) stores a large number of sample waveforms, assuming each syllable to be a speech unit. However, the present invention may also use a database that stores sample waveforms under the assumption that a phoneme is a speech unit. Or, in case that there is a contiguous sequence of more than one syllable without clear distinction, these syllables, in addition to one syllable, may be treated as one cluster of syllables (Extended CV). Its definition is described in FIG. 17. A heavy syllable is given a higher priority than a light syllable and a superheavy syllable takes precedence over a heavy syllable, when they are extracted from the speech database. For instance, if a sequence of syllables is regarded as a superheavy syllable, a part of the sequence is not cut apart and extracted as a heavy syllable. Likewise, if a sequence of syllables is regarded as a heavy syllable, a part of the sequence is not cut apart and extracted as a light syllable. Accordingly, by treating a contiguous sequence of more than one syllable without clear distinction as one speech unit", continuity distortion can be avoided. In a representative embodiment of the present invention, employing at least a light syllable and a heavy syllable is recommended.

The speech corpus is used in the embodiment described above. However, the speech database that stores one speech waveform data each per one syllable (one phoneme or one Extended CV) may be used. Furthermore, the speech database storing one pitch-unit waveform data each per one syllable (one phoneme or one Extended CV) may also be used.

Moreover, in the embodiment as described above, a zero-crossing mark is stored on the speech database. However, a zero-crossing mark may be searched for at every time of processing in accordance with a pitch mark and so on, instead of being pre-stored on the speech database.

(5) Other Embodiment of Pitch Conversion Processing

In the embodiment described above, pitch change is performed by means of inserting or deleting a substantial zero value segment at zero crossing point. However, pitch may be changed by means of time compression or time extension of the segment where the waveform is declining and converging on the minus peak (see γ in FIG. 1). Generally, the time compression and time extension might generate undesirable frequency components that have no relation with pitch conversion. However, since the waveform is simply declining and does not contain many frequency components in the segment of γ, distortion to speech sound quality is considered small.

By the way, instead of carrying out the processing of time compression or time extension of the segment of γ evenly, the intensive time processing may be performed at around zero crossing, and the farther from the zero crossing the less intensive time processing may be performed.

2. The Second Embodiment of this Invention

Figure 18:
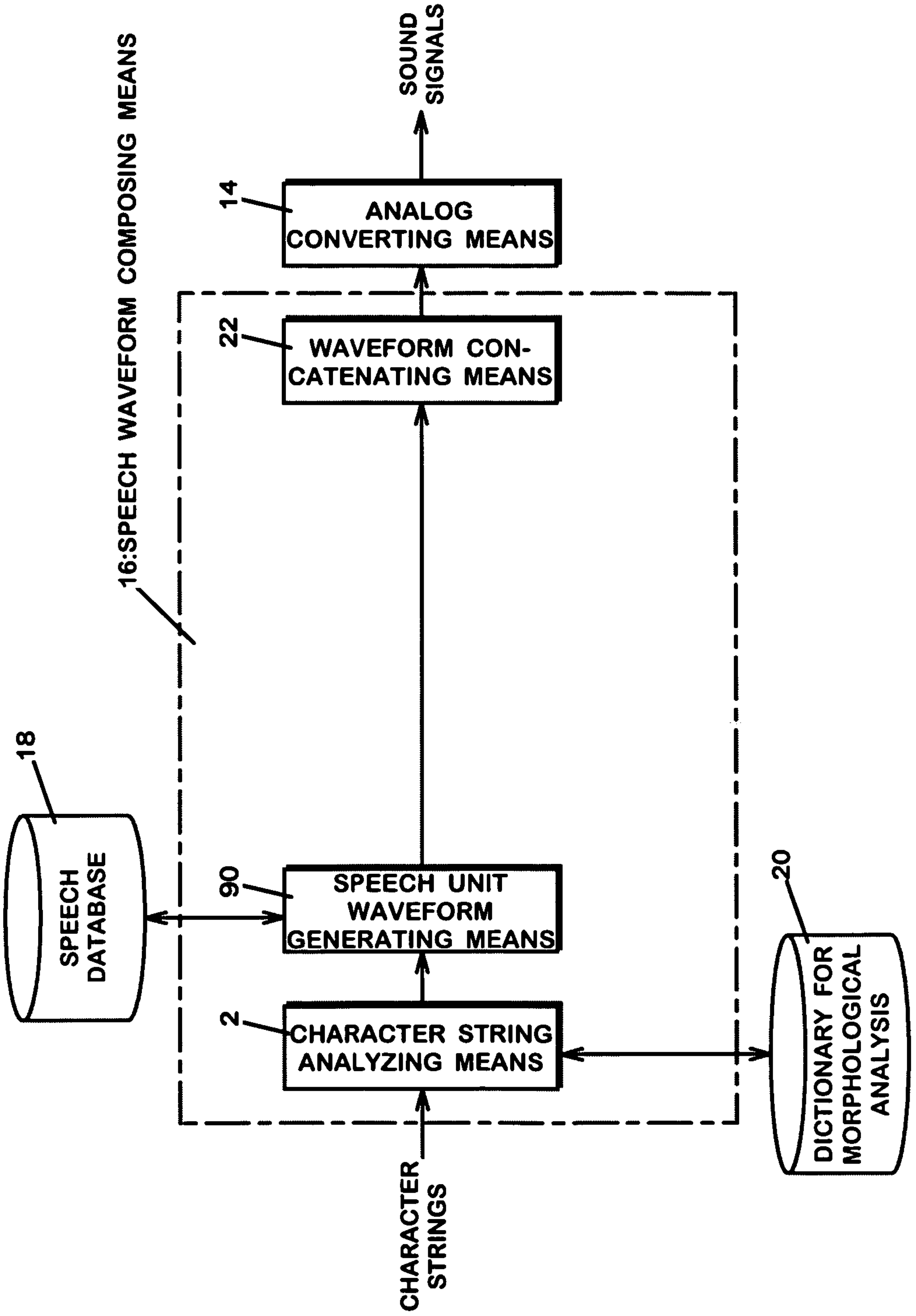
FIG. 18 is a diagram illustrating an overall configuration of the second embodiment of the present invention.

FIG. 18 shows an overall configuration of the speech synthesis device of the second embodiment of the present invention. In this embodiment, speech waveform composing means 16 comprises character string analyzing means 2, speech unit waveform generating means 90, and waveform concatenating means 22. For generating a speech unit (such as a syllable), a speech database 18 stores several pitch-unit waveforms of speech sound, which are slightly different from one another in pitch. For instance, many pitch-unit waveforms for generating a syllable of /a/ are stored in various pitch lengths slightly different by about 1 ms. All other syllables (voiced sounds) are stored in a similar manner. For unvoiced sounds, noise waveforms are stored on the speech database 18.

A provided character string is morphologically analyzed with the character string analyzing means 2, referring to a dictionary for morphological analysis 20. The character string is divided into speech units. In addition, with referring to the environment of the preceding and succeeding sound sequence, the voiced and unvoiced sounds classification, the duration, the contour of amplitude, and the contour of fundamental frequency are determined for each speech unit by referring to the dictionary for morphological analysis 20.

The speech unit waveform generating means 90 obtains a pitch-unit waveform required for generating each speech unit, from the speech database 18. On this occasion, the waveforms with proper pitch length at each time are selected and picked out in accordance with the contour of fundamental frequency provided by the character string analyzing means 2. Then, the speech unit waveform generating means 90 modifies these pitch-unit waveforms with reference to the duration and the contour of amplitude provided by the character string analyzing means 2, and generates a waveform in a speech unit by means of concatenation. As for unvoiced sounds, the speech unit waveform generating means 90 generates waveforms using reference to the noise waveforms.

The speech waveforms in each speech unit generated as described above are concatenated with the waveform concatenating means 22. Thus, a speech waveform data is produced.

The analog converting means 14 converts this speech waveform data into analog sound signals and produces output.

Figure 19:
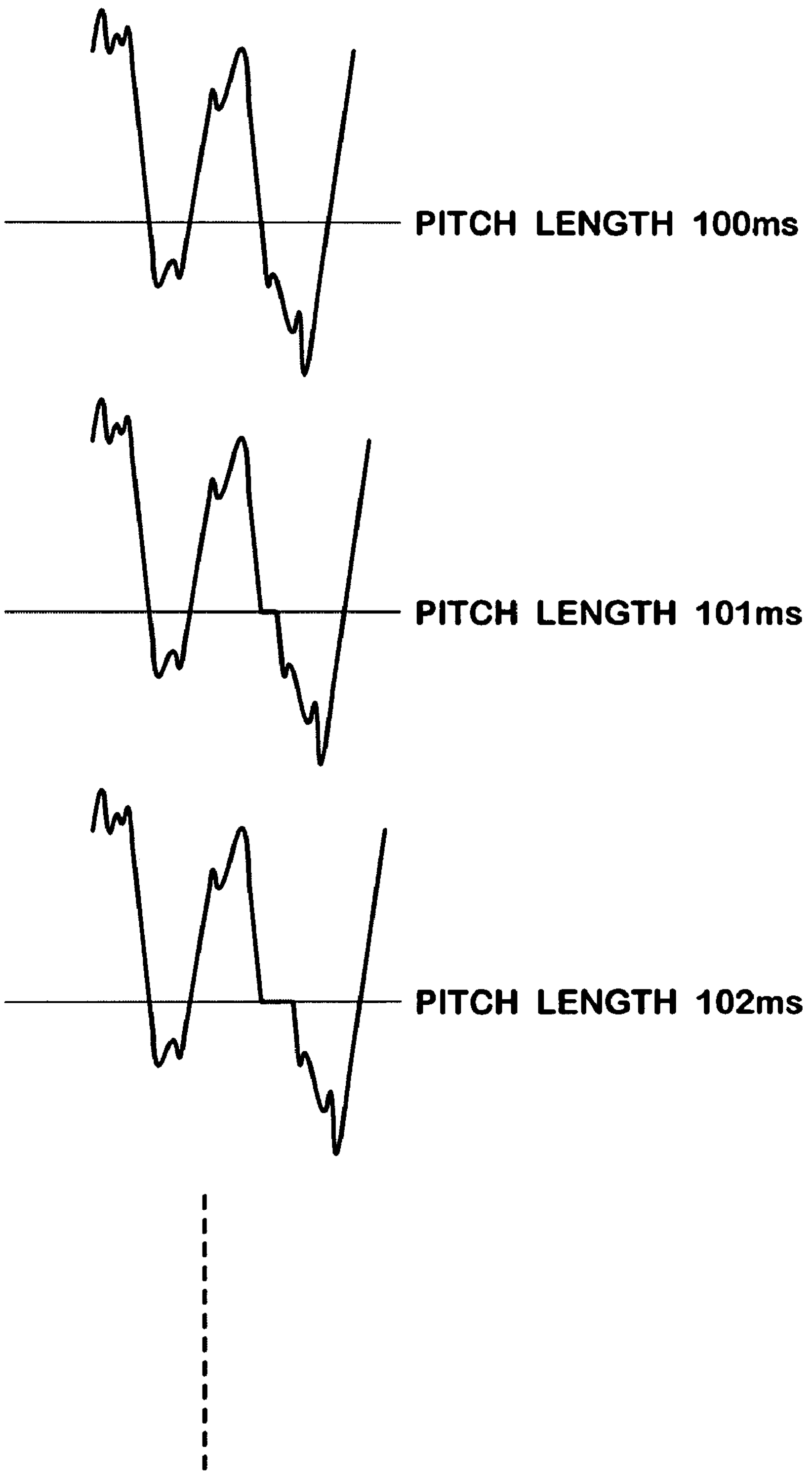
FIG. 19 is a graph showing the contents of a speech database.

FIG. 4 shows a representative embodiment of a hardware configuration using a CPU for the speech synthesis device of FIG. 18. In this embodiment, a waveform in a speech unit (such as a syllable) is synthesized by means of concatenating pitch-unit waveforms. For this reason, a lot of speech sound data of pitch-unit waveforms with various pitch lengths are prepared in the database 18 as shown in FIG. 19. These pitch length variations are obtained through the insertion of zero value segments at the last zero crossing point just before the minus peak.

In this embodiment as in the previous embodiment, pitch conversion may be performed at every time of processing. In this manner, there is no need to prepare the various pitch length data. Instead, only one kind of pitch length data must be stored in the speech database 18.

In addition, as one of ordinary skill in the art would appreciate, the other embodiments described in the first embodiment may be applied to this second embodiment.

3. Other Embodiment

In the above embodiments, pitch conversion is processed in accordance with the result of the analysis carried out by means of the character string analyzing means 2. However, the pitch conversion may be performed through commands entered by an operator.

Figure 20:
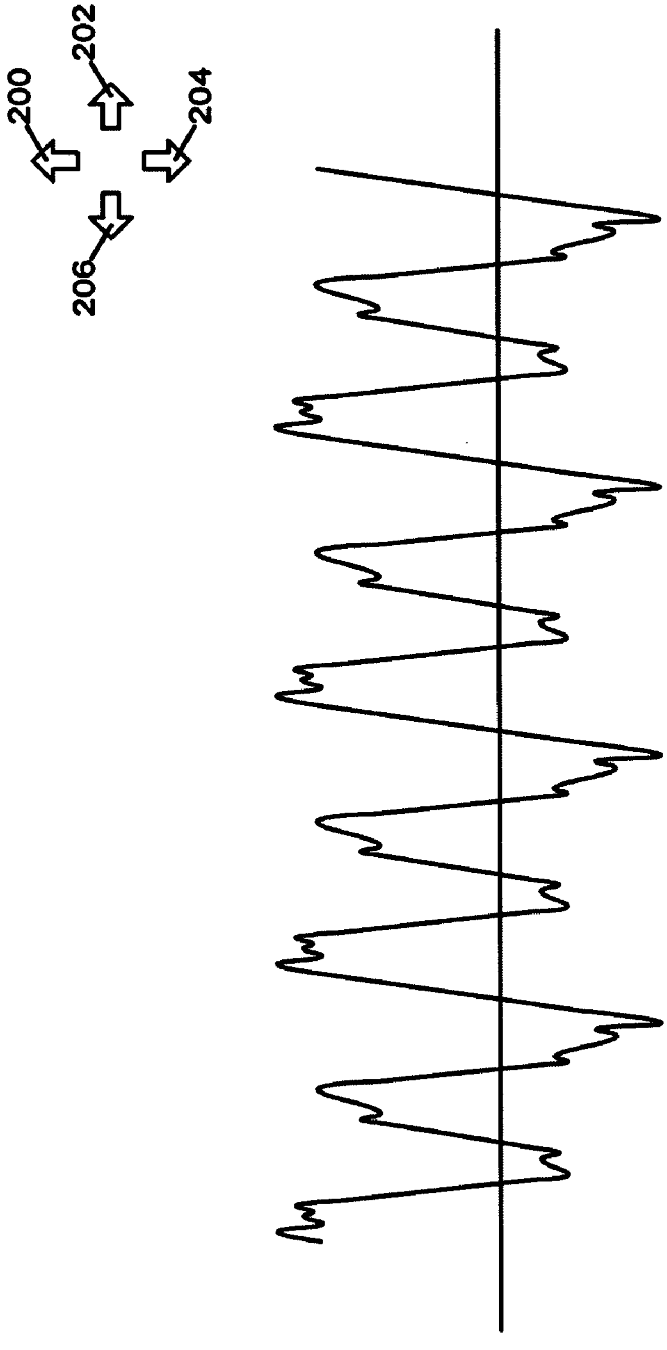
FIG. 20 is a view illustrating icons for operation.
Figure 21:
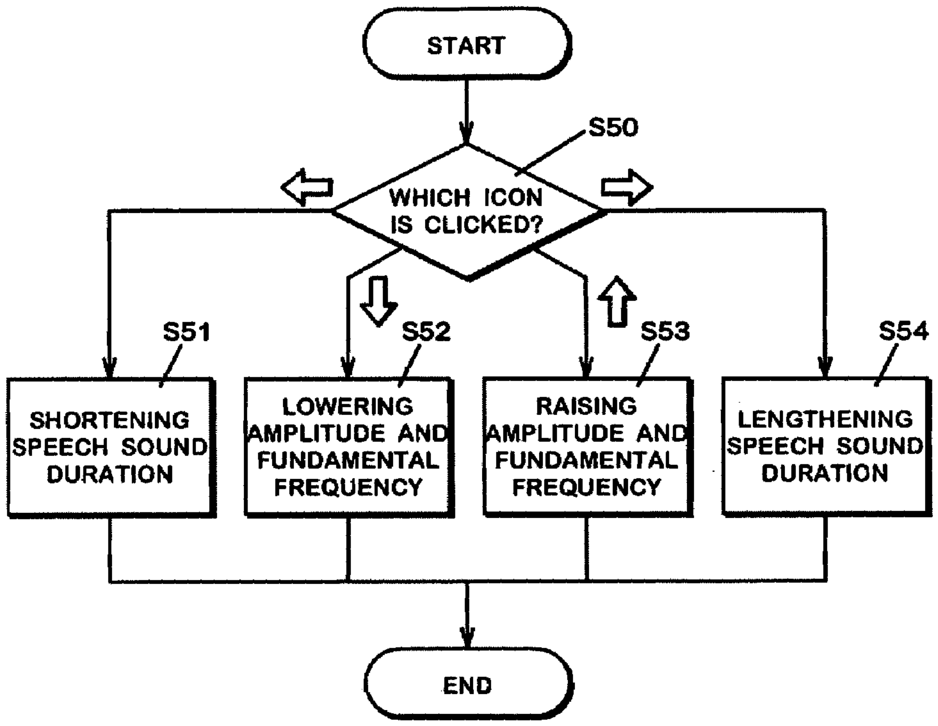
FIG. 21 is a flow chart showing the program for judging entered commands.
Figure 22:
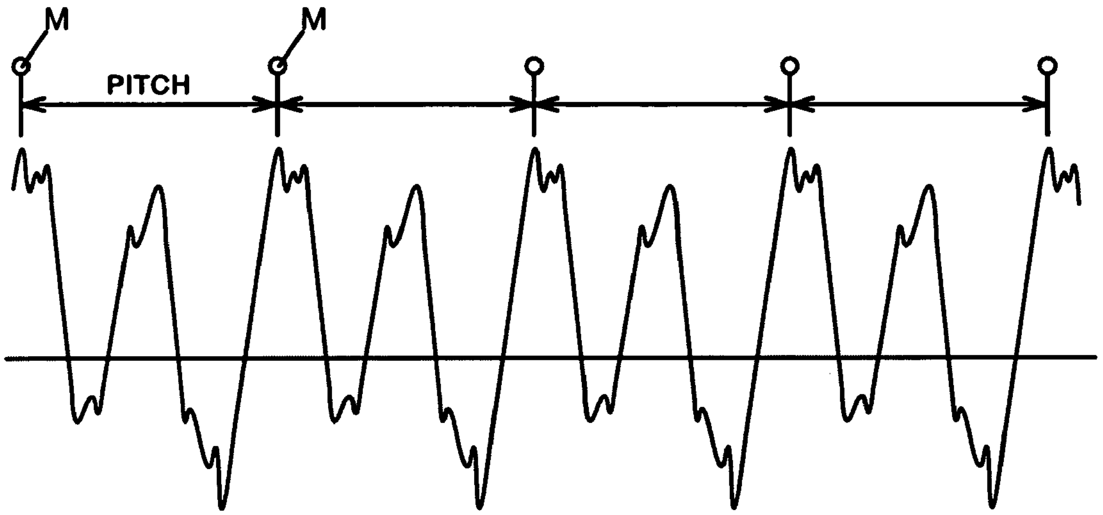
FIG. 22 is a graph showing pitches of speech sound.
Figure 23:
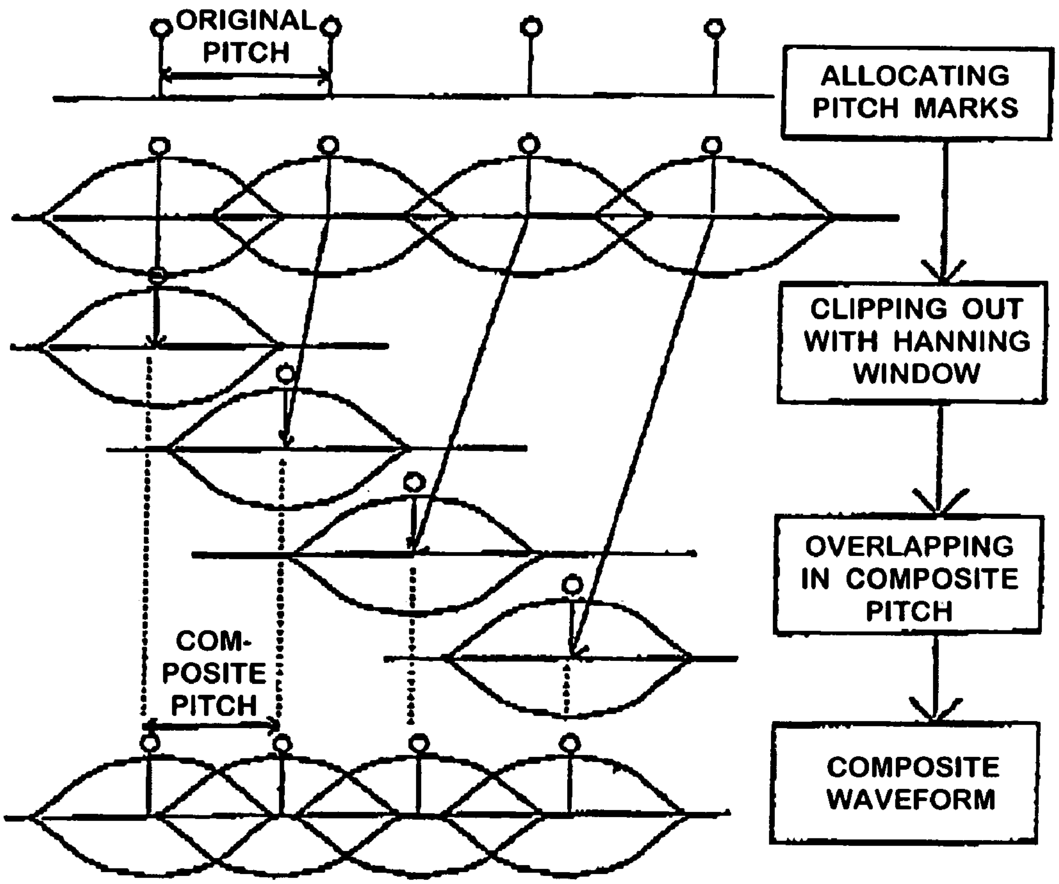
FIG. 23 is a view illustrating pitch conversion process by using PSOLA method.
Figure 24:
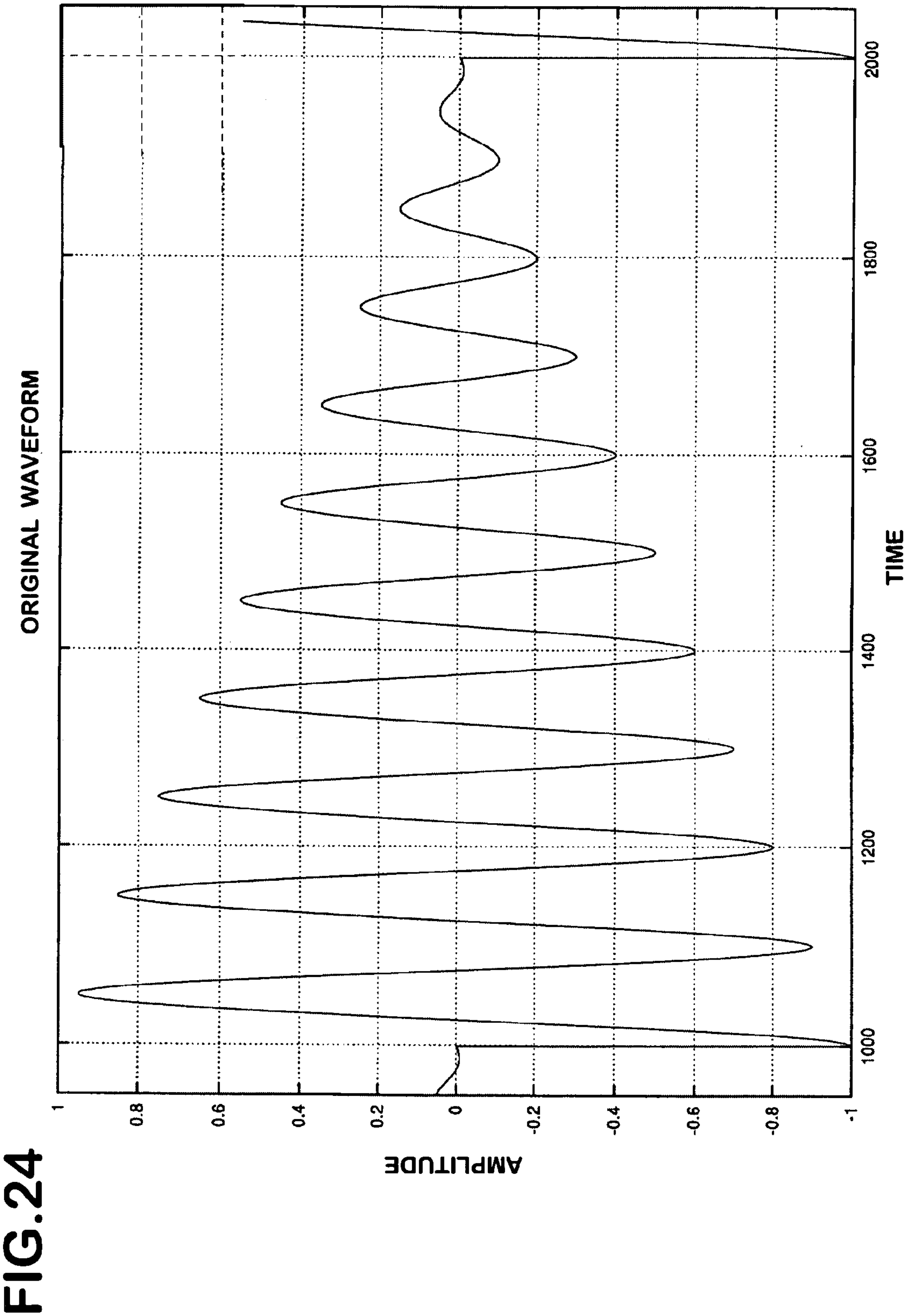
FIG. 24 is a graph showing the effect of processing using PSOLA method (original waveform)
Figure 25:
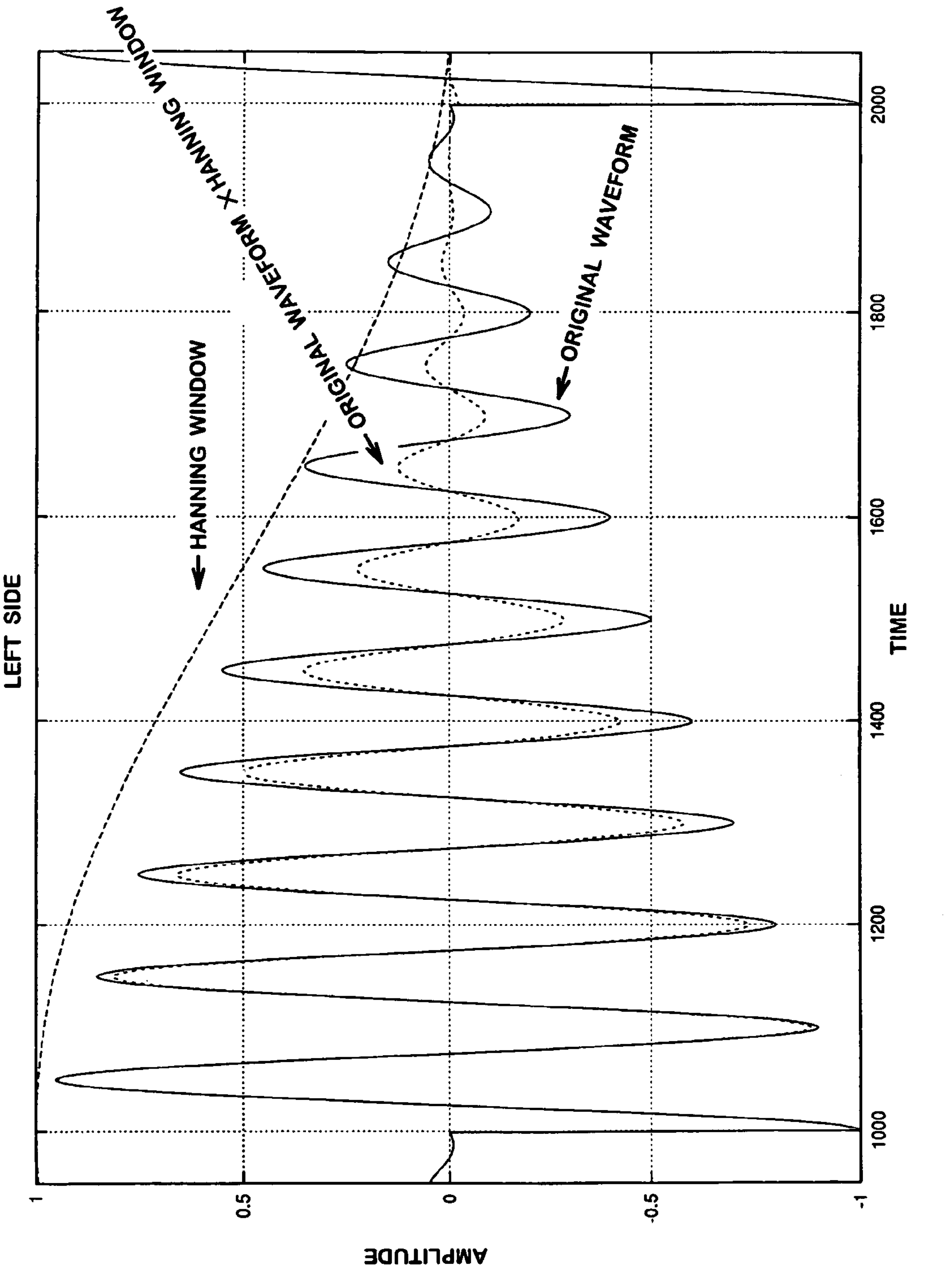
FIG. 25 is a graph showing the effect of processing using PSOLA method (left side components of Hanning window)
Figure 26:
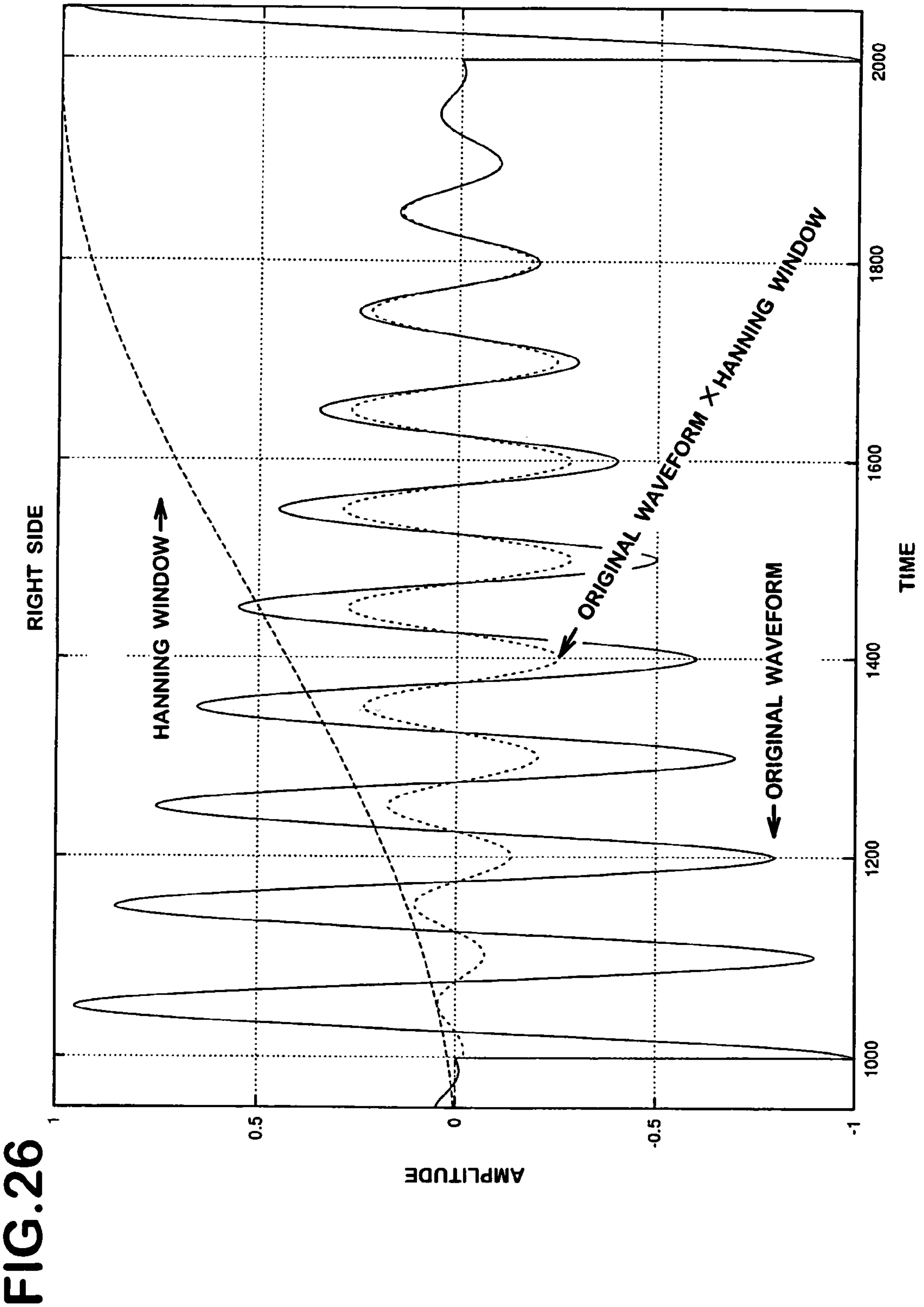
FIG. 26 is a graph showing the effect of processing using PSOLA method (right side components of Hanning window)
Figure 27:
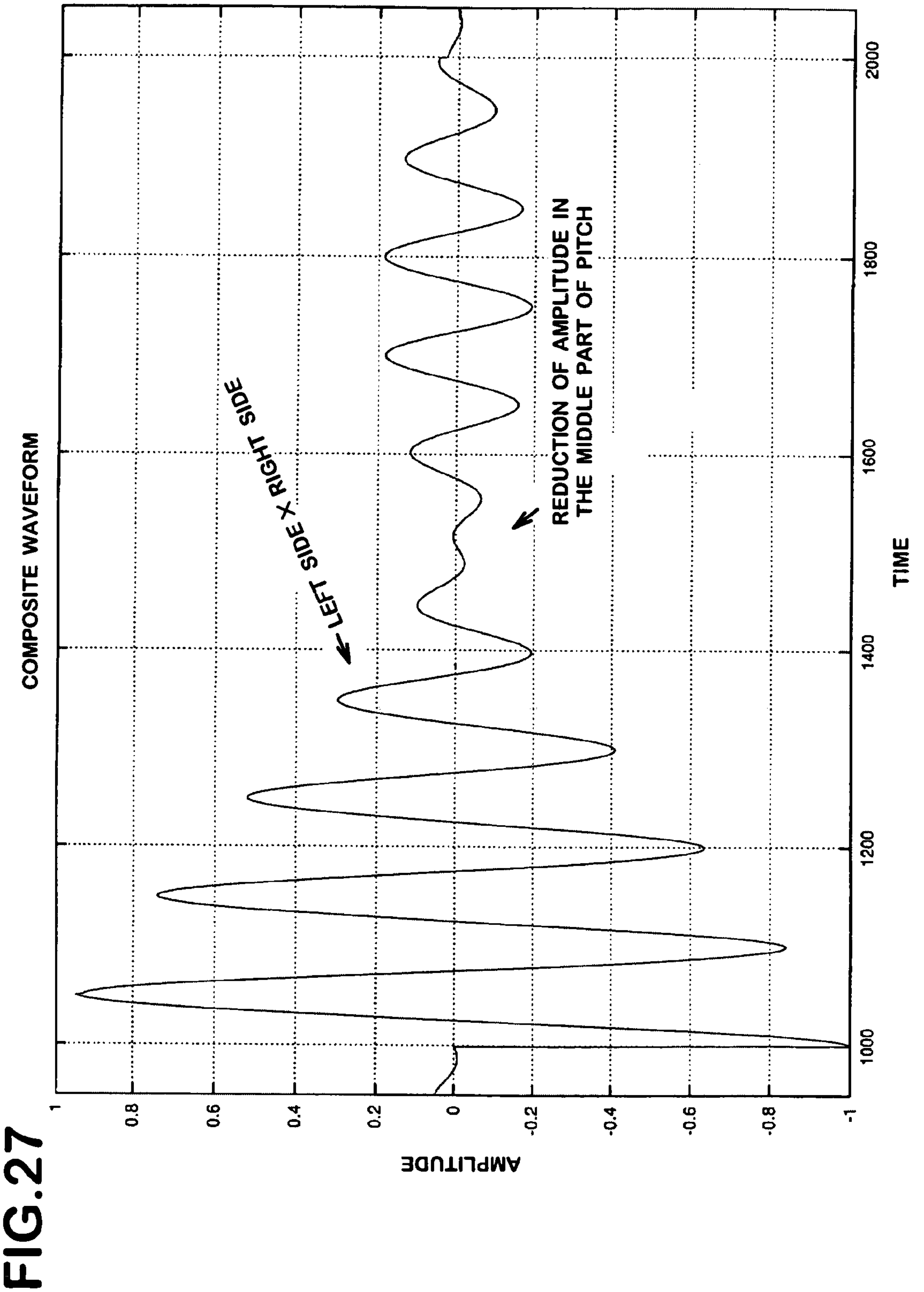
FIG. 27 is a graph showing the effect of processing using PSOLA method (composite waveform)
Figure 28:
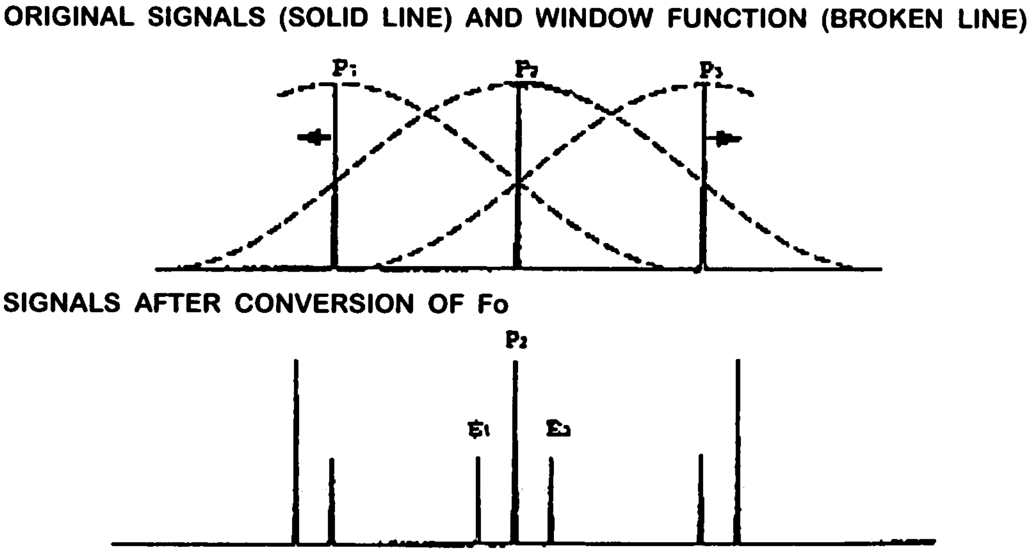
FIG. 28 is a schematic illustration of echo generation by using PSOLA method.

FIG. 20 shows an example of a screen display for entering these commands. FIG. 21 is a flow chart showing the program for judging entered commands stored on the hard disk 44.

Amplitude and fundamental frequency of speech sound are raised by clicking the icon 200 (up arrow) with the mouse 34 (steps S50 and S53). In the same way, amplitude and fundamental frequency of speech sound are lowered by clicking the icon 204 (down arrow) (steps S50 and S52 of FIG. 21). Duration of speech sound is shortened by means of, for instance, deleting several pitch-unit waveforms, by clicking the icon 206 (left arrow) (steps S50 and S51 of FIG. 21). On the other hand, duration of speech sound is lengthened by means of, for instance, duplicating several pitch-unit waveforms, by clicking the icon 202 (right arrow) (steps S50 and S54 of FIG. 21).

While the methods of pitch modification described so far are preferable, other method may be also applied.

Thus, a pair of arrows (the up arrow and the down arrow, or the left arrow and the right arrow) corresponds to the processing of two opposite modifications. Accordingly, the contents of processing are intuitionally understandable, providing an easy operation for entering commands.

Alternatively, instead of using the screen icons in the above embodiment, entry switches shaped as an arrow or with an indication of an arrow may be used.

In the above embodiment, each of the up arrow and the down arrow corresponds to the processing of both amplitude and fundamental frequency. However, the processing of each one, two, or three of amplitude, fundamental frequency, and utterance duration may be arranged to be assigned to each arrow. This arrangement applies also to the right arrow and the left arrow. Furthermore, obliquely pointing arrows may also be adopted and assigned for both tasks associated with vertically pointing arrows and horizontally pointing arrows.

4. Other Aspects of the Present Invention

While, in the above embodiment, a CPU is used to provide the respective functions shown in FIG. 3 and FIG. 18, a part or all of the functions may be given by using hardware logic.

The speech synthesis device may be characterized by comprising pitch converting means for converting pitch by means of processing a segment of a waveform in which the waveform is converging on a minus peak during a periodical unit of speech waveform data.

Therefore, the waveform can be processed in the segment that is less affected by the minus peak associated with the glottal closure, and then pitch can be converted without distorting naturalness.

The speech synthesis device may be characterized by providing the largest processing value at around zero crossing point and the smaller value at the farther from zero crossing point, within the segment in which waveform is converging on the minus peak.

Accordingly, pitch can be adjusted without distorting naturalness since the processing complies with the actual speech sound characteristic that each duration of zero value segment is different.

The speech synthesis device may be characterized by shortening or lengthening pitch by means of compressing or extending waveform along the time axis in the segment in which the waveform is converging on the minus peak.

Consequently, waveform can be processed through time compression or time extension in the segment that is less affected by the minus peak associated with the glottal closure. As such, pitch can be converted without a distortion in naturalness.

The speech synthesis device may be characterized by performing waveform processing at around zero crossing point within the segment where the waveform is converging on the minus peak. Therefore, processing can be performed in the segment that is less affected due to rather small amplitude.

The speech synthesis device may be characterized by performing waveform processing at around zero crossing point by means of either inserting a substantial zero value segment to lengthen pitch or of eliminating a substantial zero value segment to shorten pitch.

Therefore, pitch can be converted, minimizing the influence on a spectrum. In addition, a simple operation like insertion and deletion of a zero value segment makes the waveform processing speedy.

The pitch converting method for speech waveform may be characterized in that pitch conversion is performed by way of processing waveform in the segment in which the waveform is converging on the minus peak during the periodical unit of speech waveforms.

Consequently, waveform can be processed in the segment that is less affected by the minus peak associated with the glottal closure, and pitch can be converted without losing naturalness.

The speech processing device may be characterized by modifying at least any one of amplitude, fundamental frequency or duration of speech with using corresponding icons or switches of the up arrow, the down arrow, the right arrow, or the left arrow.

Accordingly, speech sound amplitude, fundamental frequency or duration can be converted in a simple operation.

The speech processing device may be characterized by assigning the up arrow at least to raise fundamental frequency and the down arrow at least to lower fundamental frequency. Therefore, the present invention provides an easy-to-use, intuitive user interface for pitch conversion processing.

While the embodiments of the present invention, as disclosed herein, constitute preferred forms, it is to be understood that each term was used as illustrative and not restrictive, and can be changed within the scope of the claims without departing from the scope and spirit of the invention.

What is claimed is:

1. A speech synthesis device comprising:

speech database storing means for storing sample waveform data in a speech unit and a speech database created by way of associating the sample sound waveform data with their corresponding phonetic information;

speech waveform composing means for dividing phonetic information into speech units upon receiving the phonetic information of speech sound to be synthesized, for obtaining sample speech waveform data corresponding to the each phonetic information in a speech unit from the speech database, and for generating speech waveform data to be composed by means of concatenating the sample speech waveform data in speech units; and analog converting means for converting the speech waveform data received from the speech waveform composing means into analog signals;

wherein the speech waveform composing means comprises pitch converting means for converting pitch by means of processing a segment of a waveform in which the waveform is converging on a segment just before a minus peak during a periodical unit of speech waveform data, at said segment the speech waveform being depending on vocal tract shape and being attending and converging on the minus peak.

2. The speech synthesis device of claim 1, wherein, within the segment in which the waveform is converging on the minus peak, a largest processing value is provided at around a zero crossing point and a smaller value is provided at a point farther from the zero crossing point.

3. The speech synthesis device of claim 1, wherein pitch is one of shortened and lengthened by one of compressing and extending, respectively, the waveform along a time axis in the segment in which the waveform is converging on the minus peak.

4. The speech synthesis device of claim 1, wherein waveform processing at around zero crossing point is performed within the segment in which the waveform is converging on the minus peak.

5. The speech synthesis device of claim 1, wherein waveform processing at around zero crossing point is performed by one of inserting a substantial zero value segment to lengthen pitch and eliminating a substantial zero value segment to shorten pitch.

6. A computer-readable storing medium storing a program for executing pitch conversion using a computer having speech database storing means for storing sample waveform data in a speech unit and a speech database created by way of associating the sample sound waveform data with their corresponding phonetic information, the program comprising the step of:

dividing phonetic information into speech units upon receiving the phonetic information of speech sound to be synthesized, obtaining sample speech waveform data corresponding to the each phonetic information in a speech unit from the speech database, converting pitch by means of processing a segment of a waveform in which the waveform is converging on a segment just before a minus peak during a periodical unit of speech waveform data, at said segment, the speech waveform being depending on vocal tract shape and being attending and converging on the minus peak, and generating speech waveform data to be composed by means of concatenating the sample speech waveform data in speech units.

7. The storing medium of claim 6, wherein, within the segment in which waveform is converging on the minus peak, a largest processing value is provided at around a zero crossing point and a smaller value is provided at a point farther from the zero crossing point.

8. The storing medium of claim 6, wherein pitch is one of shortened and lengthened and lengthened by one of compressing and extending, respectively, the waveform along a time axis in the segment in which the waveform is converging on the minus peak.

9. The storing medium of claim 6, wherein waveform processing at around a zero crossing point is performed within the segment in which the waveform is converging on the minus peak.

10. A speech synthesis device comprising:

speech database storing means for storing a speech database having several sample speech waveform data with various pitch lengths for each speech unit and phonetic information associated with the sample waveform data;

speech waveform composing means for dividing phonetic information into speech units upon receiving phonetic information of speech sound to be synthesized, for obtaining a desirable sample speech waveform data from among the sample speech waveform data corresponding to the divided phonetic information in a speech unit in the speech database, and for generating speech waveform data to be composed by means of concatenating the obtained sample speech waveform data in speech units; and analog converting means for converting the speech waveform data received from the speech waveform composing means into analog signals;

wherein the speech database is constructed of several sample speech waveform data with various pitch lengths prepared by modifying a contour of a waveform in a segment in which the waveform is converging on the minus peak during a periodical unit of speech waveform data.

11. A computer-readable storing medium storing a program for executing speech synthesis by means of a computer using a speech database, the program comprising the steps of:

receiving phonetic information of speech sound to be synthesized and dividing phonetic information into speech units;

obtaining a desirable sample speech waveform data from among sample speech waveform data corresponding to the divided phonetic information in a speech unit in the speech database; and generating speech waveform data to be composed by means of concatenating the obtained sample speech waveform data in speech units;

wherein the speech database is constructed of several sample speech waveform data with various pitch lengths prepared by modifying a contour of a waveform in a segment in which the waveform is converging on a minus peak during a periodical unit of speech waveform data.

12. A method of pitch conversion for speech waveform, the method comprising the steps of:

preparing speech database for storing sample waveform data in a speech unit and a speech database created by way of associating the sample sound waveform data with their corresponding phonetic information, dividing phonetic information into speech units upon receiving the phonetic information of speech sound to be synthesized, obtaining sample speech waveform data corresponding to the each phonetic information in a speech unit from the speech database, converting pitch by means of processing a segment of a waveform in which the waveform is converging on a segment just before a minus peak during a periodical unit of speech waveform data, at said segment the speech waveform being depending on vocal tract shape and being attending and converging on the minus peak, and generating speech waveform data to be composed by means of concatenating the sample speech waveform data in speech units.

* * * * *